US012625004B2

(12) United States Patent
Hagman et al.

(10) Patent No.: US 12,625,004 B2
(45) Date of Patent: May 12, 2026

(54) DETECTION THRESHOLD DETERMINATION FOR INFRARED IMAGING SYSTEMS AND METHODS

(71) Applicant: FLIR Systems AB, Täby (SE)

(72) Inventors: Henning Hagman, Täby (SE); Per Lilja, Åkersberga (SE)

(73) Assignee: FLIR Systems AB, Täby (SE)

( * ) Notice: Subject to any disclaimer, the term of this patent is extended or adjusted under 35 U.S.C. 154(b) by 190 days.

(21) Appl. No.: 18/731,082

(22) Filed: May 31, 2024

(65) Prior Publication Data

US 2024/0319013 A1 Sep. 26, 2024

Related U.S. Application Data

(63) Continuation of application No. PCT/US2022/051144, filed on Nov. 29, 2022.

(Continued)

(51) Int. Cl.
*G01J 5/02* (2022.01)
*G01J 5/06* (2022.01)
G01J 5/00 (2022.01)

(52) U.S. Cl.
CPC .............. *G01J 5/025* (2013.01); *G01J 5/064* (2022.01); *G01J 2005/0077* (2013.01); *G01J 2005/066* (2013.01)

(58) Field of Classification Search
CPC .... G01J 5/025; G01J 5/064; G01J 2005/0077; G01J 2005/066; G01J 5/80; G01J 5/0014; G01M 3/002; G01M 3/38
See application file for complete search history.

(56) References Cited

U.S. PATENT DOCUMENTS

2007/0206184 A1 9/2007 Uto et al.

FOREIGN PATENT DOCUMENTS

| CN | 102589815 | 7/2012 |
| CN | 103344388 | 2/2016 |

(Continued)

OTHER PUBLICATIONS

Jadin et al., "Gas Leakage Detection Using Thermal Imaging Technique," 2014 UKSim-AMSS 16th International Conference on Computer Modelling and Simulation, pp. 302-306.DOI 10.1109/UKSim.2014.95. (Year: 2014).*

(Continued)

*Primary Examiner* — Kiho Kim
(74) *Attorney, Agent, or Firm* — Haynes and Boone, LLP

(57) ABSTRACT

Techniques are provided for facilitating detection threshold determination for infrared imaging systems and methods. In one example, a method includes capturing, by an imaging device, a thermal image of a scene. The method further includes determining temperature difference data indicative of a difference between temperature data of the thermal image associated with a background of the scene and temperature data of the thermal image associated with gas detection. The method further includes determining detection threshold data based on sensitivity characteristics associated with the imaging device and the temperature difference data. The method further includes generating a detection threshold image based on the detection threshold data. Each pixel of the detection threshold image corresponds to a respective pixel of the thermal image and has a value indicative of a detection threshold associated with the respective pixel of the thermal image. Related devices and systems are also provided.

20 Claims, 9 Drawing Sheets

Related U.S. Application Data

(60) Provisional application No. 63/285,987, filed on Dec. 3, 2021.

(56) References Cited

FOREIGN PATENT DOCUMENTS

| CN | 107532999 A | * | 1/2018 | .......... G01N 21/314 |
| WO | WO 2015166265 | | 11/2015 | |

OTHER PUBLICATIONS

Jonas Sandsten et al., "Optical Gas Imaging Standard for Sensitivity and Detection of Gases", Extended Abstract #544, A&WMA's 108th Annual Conference, Jun. 2015.

* cited by examiner

Figure 1:
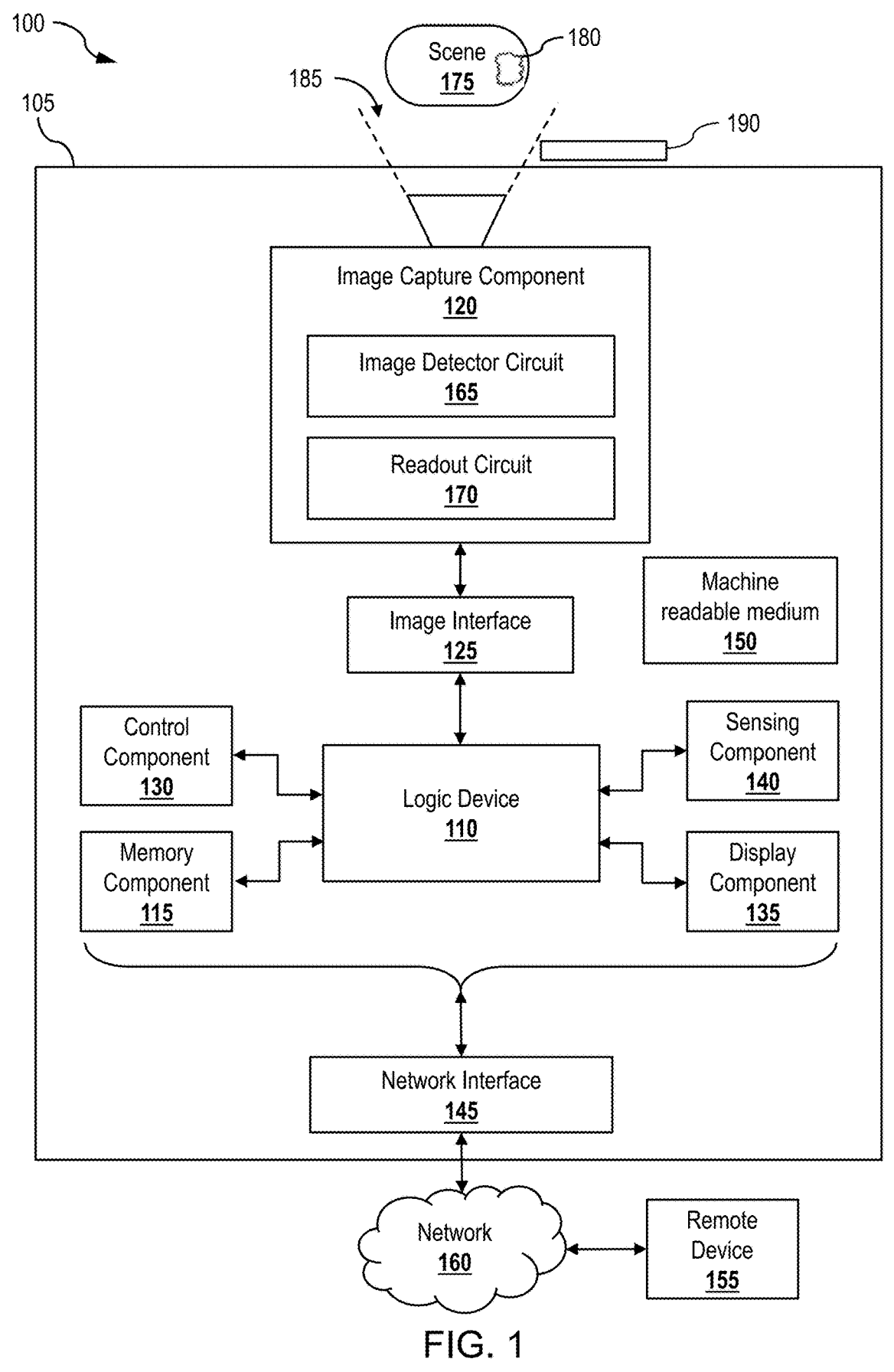

100

105

Scene
175

180

185

190

Image Capture Component
120

Image Detector Circuit
165

Readout Circuit
170

Image Interface
125

Machine
readable medium
150

Control
Component
130

Logic Device
110

Sensing
Component
140

Memory
Component
115

Display
Component
135

Network Interface
145

Network
160

Remote
Device
155

Temperature image (degrees C)

605

625 dT image (degrees)

610

Det lim image (ppmm)

Temperature image (degrees C)

dT image (degrees)

Det lim image (ppmm)

DETECTION THRESHOLD DETERMINATION FOR INFRARED IMAGING SYSTEMS AND METHODS

CROSS REFERENCE TO RELATED APPLICATIONS

This application is a continuation of International Patent Application No. PCT/US2022/051144 filed Nov. 29, 2022 and entitled "DETECTION THRESHOLD DETERMINATION FOR INFRARED IMAGING SYSTEMS AND METHODS," which claims priority to and the benefit of U.S. Provisional Patent Application No. 63/285,987 filed Dec. 3, 2021 and entitled "DETECTION THRESHOLD DETERMINATION FOR INFRARED IMAGING SYSTEMS AND METHODS," all of which are incorporated herein by reference in their entirety.

TECHNICAL FIELD

One or more embodiments relate generally to imaging and more particularly, for example, to detection threshold determination for infrared imaging systems and methods.

BACKGROUND

Imaging systems may include an array of detectors arranged in rows and columns, with each detector functioning as a pixel to produce a portion of a two-dimensional image. For example, an individual detector of the array of detectors captures an associated pixel value. There are a wide variety of image detectors, such as visible-light image detectors, infrared image detectors, or other types of image detectors that may be provided in an image detector array for capturing an image. As an example, a plurality of sensors may be provided in an image detector array to detect electromagnetic (EM) radiation at desired wavelengths. In some cases, such as for infrared imaging, readout of image data captured by the detectors may be performed in a time-multiplexed manner by a readout integrated circuit (ROIC). The image data that is read out may be communicated to other circuitry, such as for processing, storage, and/or display. In some cases, a combination of a detector array and an ROIC may be referred to as a focal plane array (FPA). Advances in process technology for FPAs and image processing have led to increased capabilities and sophistication of resulting imaging systems.

SUMMARY

In one or more embodiments, a method includes capturing, by an imaging device, a thermal image of a scene. The method further includes determining temperature difference data indicative of a difference between temperature data of the thermal image associated with a background of the scene and temperature data of the thermal image associated with gas detection. The method further includes determining detection threshold data based on sensitivity characteristics associated with the imaging device and the temperature difference data. The method further includes generating a detection threshold image based on the detection threshold data. Each pixel of the detection threshold image corresponds to a respective pixel of the thermal image and has a value indicative of a detection threshold associated with the respective pixel of the thermal image.

In one or more embodiments, an infrared imaging system includes an infrared imager configured to capture a thermal image of a scene. The infrared imaging system further includes a logic device configured to determine temperature difference data indicative of a difference between temperature data of the thermal image associated with a background of the scene and temperature data of the thermal image associated with gas detection. The logic device is further configured to determine detection threshold data based on sensitivity characteristics associated with the infrared imager and the temperature difference data. The logic device is further configured to generate a detection threshold image based on the detection threshold data. Each pixel of the detection threshold image corresponds to a respective pixel of the thermal image and has a value indicative of a detection threshold associated with the respective pixel of the thermal image.

The scope of the present disclosure is defined by the claims, which are incorporated into this section by reference. A more complete understanding of embodiments of the present disclosure will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIG. 1 illustrates a block diagram of an example imaging system in accordance with one or more embodiments of the present disclosure.

Figure 2:
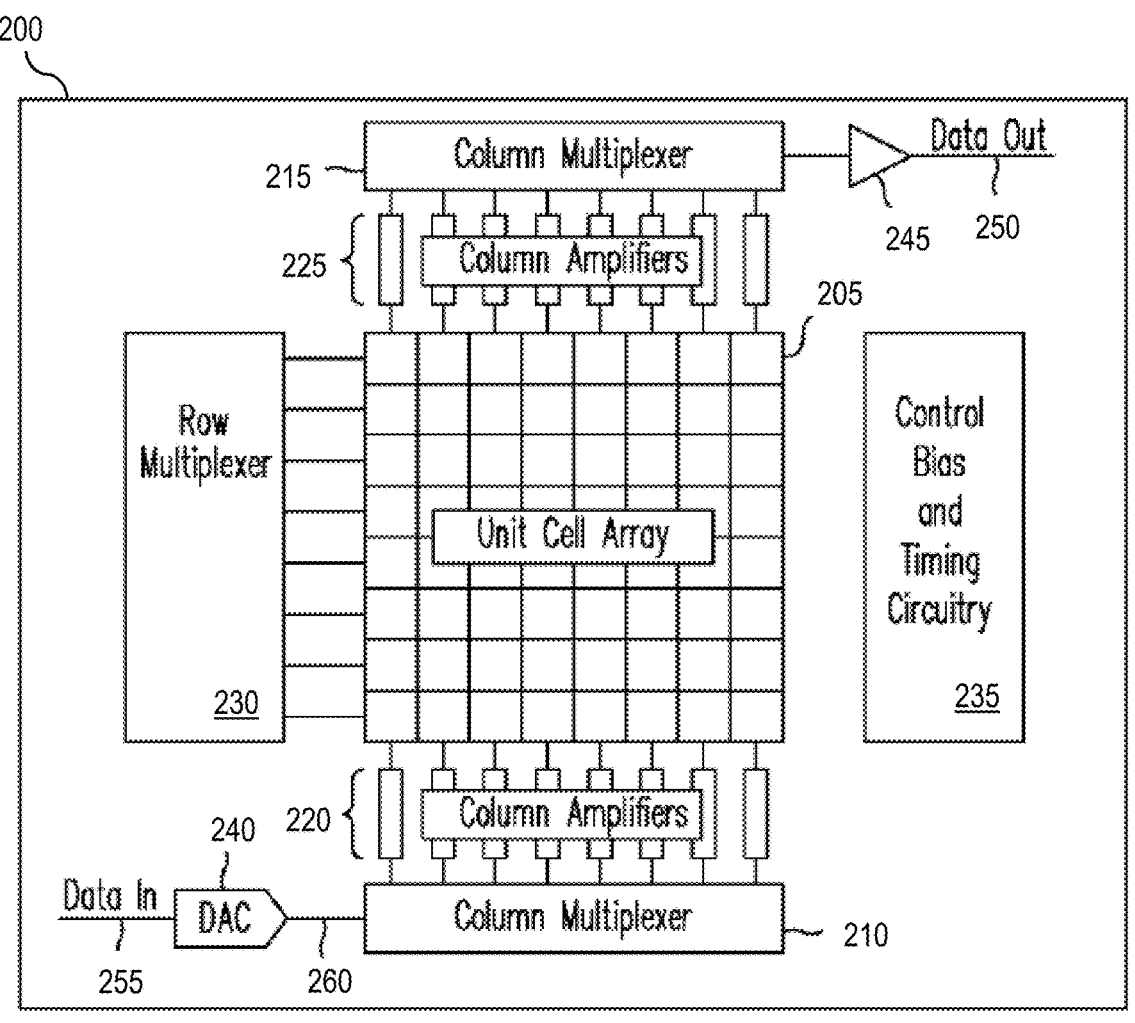
FIG. 2 illustrates a block diagram of an example image sensor assembly in accordance with one or more embodiments of the present disclosure.

Embodiments of the present disclosure and their advantages are best understood by referring to the detailed description that follows. It is noted that sizes of various components and distances between these components are not drawn to scale in the figures. It should be appreciated that like reference numerals are used to identify like elements illustrated in one or more of the figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, structures and components are shown in block diagram form in order to avoid obscuring the concepts of the subject technology. One or more embodiments of the subject disclosure are illustrated by and/or described in connection with one or more figures and are set forth in the claims.

Various techniques provide detection threshold determination in infrared imaging systems and methods. An infrared imaging system (e.g., a thermal camera) may be used to capture infrared image data associated with a scene using an image sensor device (e.g., a detector array of an FPA). The image sensor device includes detectors (e.g., also referred to as detector pixels, detector elements, or simply pixels). Each detector pixel may detect incident EM radiation and generate infrared image data indicative of the detected EM radiation of the scene. In some embodiments, the image sensor array is used to detect infrared radiation (e.g., thermal infrared radiation). The detector pixels may be used to measure temperatures of the scene using calibrated data that correlates infrared radiation (e.g., infrared energy fluxes) detected by the detector pixels in the scene with corresponding temperatures. In this regard, for pixels of an infrared image (e.g., thermal infrared image), each output value of a pixel may be represented/provided as and/or correspond to a temperature, digital count value, percentage of a full temperature range, or generally any value that can be mapped to the temperature. For example, a digital count value of 13,000 output by a pixel may represent a temperature of 160° C. As such, the captured infrared image data may indicate or may be used to determine a temperature of objects, persons, and/or other features/aspects in the scene.

In some embodiments, the infrared imaging system may provide an optical gas imaging system. In optical gas imaging applications, infrared images of scenes may be captured and used for monitoring, inspection, and/or maintenance purposes, such as for monitoring for gas leaks in an industrial plant. The infrared imaging system may be used for detecting gas occurrence, for example in the form of a gas cloud or gas plume, and for generating a visual representation (e.g., an image) of such gas occurrence. In some cases, the image may be presented on a viewfinder of the infrared imaging system, on an integrated and/or a separate display, and/or on an external computing device to allow viewing by a user.

Specific gases may emit and/or absorb infrared (e.g., thermal) radiation in characteristic ways at particular wavelengths. Images may be captured of a scene and analyzed to determine a presence or an absence of radiation at certain wavelengths. These wavelengths may be compared with wavelengths associated with known gases to determine a presence of a particular gas(es) of interest.

Gas detection (e.g., gas leak detection) is generally facilitated when a temperature difference/contrast between a temperature of a gas in a scene and a temperature of a background of the scene is higher. Such a temperature difference/contrast may be referred to as a background-to-gas temperature difference/contrast and denoted as $\Delta T$ or dT. The gas temperature may be denoted as $T_G$ and the background temperature may be denoted as $T_B$, such that $\Delta T$ may be defined as $T_G - T_B$ or $T_B - T_G$. In addition to background-to-gas temperature differences, a detection threshold (e.g., also referred to as a detection limit) associated with detection of a gas of interest may further depend on the background of the scene, background modulations, noise associated with the infrared imaging system, a temperature span (e.g., a temperature range) represented in an image, point-spread-function of optics of the infrared imaging system, colors/Kelvin, digital units/Kelvin, a viewing angle of the infrared imaging system for capturing images of the scene, a location at which to place the infrared imaging system for capturing images of the scene, and so forth. For a given infrared imaging system, detection of different gases by the infrared imaging system is generally associated with different detection thresholds.

Gas detection is also dependent on sensitivity characteristics of the infrared imaging system. In some aspects, the sensitivity characteristics may include minimal resolvable temperature differences (MRTDs) that characterize the infrared imaging system. The MRTD provides a relation between spatial frequencies in an image plane and temperature differences, thus providing a temperature/thermal resolution (e.g., temperature/thermal sensitivity) and a spatial resolution (e.g., spatial sensitivity) associated with the infrared imaging system. The MRTD of the infrared imaging system may be measured (e.g., for different spatial frequencies and/or different temperature spans of an image). In some aspects, a measurement procedure of the MRTD may be performed according to standard test methods, such as a standard test method for MRTD for infrared imaging systems (e.g., thermal imaging systems) set forth by the American Society for Testing and Materials (ASTM).

The MRTD provides a measure that takes into consideration various parts of an infrared imaging system. Other figure of merit measures such as noise equivalent temperature difference (NETD) and modular transfer function (MTF)/spatial frequency response (SFR) may be considered to be included in the MRTD measure. In this regard, the MRTD covers factors such as background modulations, noise associated with the infrared imaging system, colors/Kelvin (e.g., granularity/quantization associated with mapping temperature to visual representation), digital units/Kelvin (e.g., granularity/quantization associated with mapping temperature to discrete counts), a temperature span of a displayed image, and a point spread function of optics of the infrared imaging system.

With regard to the MRTD, different spatial resolutions (e.g., sizes of objects/targets) are generally considered. Based on a size of a target, a minimum temperature difference that can be detected (e.g., by a human eye) in an image output by an infrared imaging system may be obtained. If a target is large enough, the minimum temperature difference may be limited by a factor to a camera noise (e.g., represented using NETD) if, for example, automatic gain control (AGC) is distributing colors (e.g., and nothing else) in the scene. If looking at small targets, the minimum detectable temperature difference may be larger since the point spread function of the optics may spread the light. The background modulations may be considered as different spatial frequencies and thus correlated to a minimum detectable temperature difference. For colors/Kelvin, the AGC may distribute colors output by the infrared imaging system, which may limit the MRTD. For example, if the camera noise is 50 mK and 10 colors/Kelvin are distributed, a difference of 100 mK may be detectable (e.g., the MRTD worsens by a factor of two). Digital units/Kelvin provides a system response that, similar to colors/Kelvin, may distribute colors and also affect the noise. The system response of a thermal imager (e.g., an uncooled thermal imager) may vary with ambient temperature.

In some embodiments, the infrared imaging system may capture thermal infrared images and determine detection threshold images based on the thermal infrared images. In this regard, for a given detection threshold image, each pixel of the detection threshold image may correspond to a pixel of a thermal infrared image. The thermal infrared image may be appropriately processed to obtain the corresponding detection threshold image. Whereas a value of a pixel of the thermal infrared image is indicative of a temperature associated with the pixel, a value of the corresponding pixel of the detection threshold image is indicative of a detection threshold associated with the pixel. As such, the detection threshold image provides a map of detection thresholds to the user. For the thermal infrared image, a palette may be used to map a temperature value to a corresponding color value or greyscale value. For the corresponding detection threshold image, a palette may be used to map a detection threshold value to a corresponding color value or greyscale value. In an aspect, the thermal infrared image may also be referred to as a temperature image or a thermal image, and the detection threshold image may also be referred to as a detection limit image.

The detection threshold for each pixel of the detection threshold image may be based on relationships between a detection threshold metric/characteristic, a sensitivity characteristic (e.g., MRTD value), and a background-to-gas temperature difference. These relationships may be provided as equations, lookup tables, and/or generally any appropriate representations of relationships. Such equations, lookup tables, and/or other representations may be determined and adjusted during calibration (e.g., factory calibration and/or in-the-field calibration) of the image sensor device and/or based on received user input, and may be stored in memory of the infrared imaging system and/or otherwise accessible to the infrared imaging system. As an example, a high background-to-gas temperature difference and a low spatial modulation of the scene background may allow for a low detection threshold. In some aspects, the detection threshold metric/characteristic may be, or may be indicative of, a lowest detectable concentration length (e.g., provided in units of parts per million×meter (ppmm)). The lowest detectable concentration length may also be referred to as a concentration length threshold. With the MRTD value, a value of the concentration length needed to get a difference in measured temperature that corresponds to the MRTD may be determined for each pixel in an image. An image (e.g., a map) of detection thresholds may thus be determined and presented to the user.

As provided above, the detection threshold is based in part on variables associated with a setup used to capture images. At least some of the variables may be controllable by the user. Using various embodiments, users of varying experience levels may use the infrared imaging system to capture thermal infrared images appropriate to determine detection threshold images that provide users with decision support. The users may leverage such decision support data from the detection threshold images to determine which backgrounds, viewing angles, etc. to choose when capturing images to facilitate gas detection. For example, the user may change to a different background (e.g., one determined based on detection threshold data to be more amenable to detection of a certain gas of interest) by moving the infrared imaging system to another location (e.g., taking images at a different location), changing a field of view and/or viewing angle of the infrared imaging system, and/or other adjustments. In some cases, the users may capture images with the infrared imaging system using different backgrounds, different viewing angles, different locations, and/or others and determine a detection threshold for each pixel associated with each setup (e.g., combination of one or more of background, viewing angle, and/or location). The detection thresholds associated with each setup may provide insight as to which setup is advantageous/preferable to use for detecting which gas leaks (e.g., type of gas, threshold concentration of gas).

In some embodiments, the users may readily change/shift between viewing a thermal image, a temperature difference image, a detection threshold image, or two or more of these images simultaneously. For example, the users may readily select different operation modes. In an aspect, a default imaging mode or simply an imaging mode may refer to an operation mode in which the infrared imaging system is operated to capture images and, if desired by the users, provide the images for display to the users. In an aspect, a temperature difference mode may refer to an operation mode in which the infrared imaging system is operated to determine temperature difference images and, if desired by the users, provide the temperature difference images for display to the users. In an aspect, a detection threshold/limit mode may refer to an operation mode in which the infrared imaging system is operated to determine detection threshold images and, if desired by the users, provide the detection threshold images for display to the users.

Although various embodiments are described primarily with respect to infrared imaging, methods and systems disclosed herein may be utilized in conjunction with devices and systems such as imaging systems having visible-light and infrared imaging capability, short-wave infrared (SWIR) imaging systems, light detection and ranging (LIDAR) imaging systems, radar detection and ranging (RADAR) imaging systems, millimeter wavelength (MMW) imaging systems, ultrasonic imaging systems, X-ray imaging systems, microscope systems, mobile digital cameras, video surveillance systems, video processing systems, or other systems or devices that may need to obtain image data in one or multiple portions of the EM spectrum.

Referring now to the drawings, FIG. 1 illustrates a block diagram of an example imaging system 100 in accordance with one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided.

The imaging system 100 may be utilized for capturing and processing images in accordance with an embodiment of the disclosure. The imaging system 100 may represent any type of imaging system that detects one or more ranges (e.g., wavebands) of EM radiation and provides representative data (e.g., one or more still image frames or video image frames). In some embodiments, the imaging system 100 may be used to facilitate gas detection and is appropriately sensitive at least to wavebands of EM radiation that are absorbed or emitted by one or more gases of interest. The imaging system 100 may include an imaging device 105. By way of non-limiting examples, the imaging device 105 may be, may include, or may be a part of an infrared camera, a visible-light camera, a tablet computer, a laptop, a personal digital assistant (PDA), a mobile device, a desktop computer, or other electronic device. The imaging device 105 may include a housing (e.g., a camera body) that at least partially encloses components of the imaging device 105, such as to facilitate compactness and protection of the imaging device 105. For example, the solid box labeled 105 in FIG. 1 may represent a housing of the imaging device 105. The housing may contain more, fewer, and/or different components of the imaging device 105 than those depicted within the solid box in FIG. 1. In an embodiment, the imaging system 100 may include a portable device and may be incorporated, for example, into a vehicle or a non-mobile installation requiring images to be stored and/or displayed. The vehicle may be a land-based vehicle (e.g., automobile, truck), a naval-based vehicle, an aerial vehicle (e.g., unmanned aerial vehicle (UAV)), a space vehicle, or generally any type of vehicle that may incorporate (e.g., installed within, mounted thereon, etc.) the imaging system 100. In another example, the imaging system 100 may be coupled to various types of fixed locations (e.g., a home security mount, a campsite or outdoors mount, or other location) via one or more types of mounts.

The imaging device 105 includes, according to one implementation, a logic device 110, a memory component 115, an image capture component 120 (e.g., an imager, an image sensor device), an image interface 125, a control component 130, a display component 135, a sensing component 140, and/or a network interface 145. The logic device 110, according to various embodiments, includes one or more of a processor, a microprocessor, a central processing unit (CPU), a graphics processing unit (GPU), a single-core processor, a multi-core processor, a microcontroller, a programmable logic device (PLD) (e.g., field programmable gate array (FPGA)), an application specific integrated circuit (ASIC), a digital signal processing (DSP) device, or other logic device, one or more memories for storing executable instructions (e.g., software, firmware, or other instructions), and/or or any other appropriate combination of processing device and/or memory to execute instructions to perform any of the various operations described herein. The logic device 110 may be configured, by hardwiring, executing software instructions, or a combination of both, to perform various operations discussed herein for embodiments of the disclosure. The logic device 110 may be configured to interface and communicate with the various other components (e.g., 115, 120, 125, 130, 135, 140, 145, etc.) of the imaging system 100 to perform such operations. For example, the logic device 110 may be configured to process captured image data received from the imaging capture component 120, store the image data in the memory component 115, and/or retrieve stored image data from the memory component 115. In one aspect, the logic device 110 may be configured to perform various system control operations (e.g., to control communications and operations of various components of the imaging system 100) and other image processing operations (e.g., debayering, sharpening, color correction, offset correction, bad pixel replacement, data conversion, data transformation, data compression, video analytics, etc.).

The memory component 115 includes, in one embodiment, one or more memory devices configured to store data and information, including infrared image data and information. The memory component 115 may include one or more various types of memory devices including volatile and non-volatile memory devices, such as random access memory (RAM), dynamic RAM (DRAM), static RAM (SRAM), non-volatile random-access memory (NVRAM), read-only memory (ROM), programmable read-only memory (PROM), erasable programmable read-only memory (EPROM), electrically-erasable programmable read-only memory (EEPROM), flash memory, hard disk drive, and/or other types of memory. As discussed above, the logic device 110 may be configured to execute software instructions stored in the memory component 115 so as to perform method and process steps and/or operations. The logic device 110 and/or the image interface 125 may be configured to store in the memory component 115 images or digital image data captured by the image capture component 120. In some embodiments, the memory component 115 may include non-volatile memory to store sensitivity characteristics (e.g., MRTD characteristics) for different spatial frequencies; data associated with different gases (e.g., from databases), such as typical spatial frequencies and spectra (e.g., emission spectrum, absorption spectrum) associated with various gas leaks for different field of views and distances; and/or other data facilitating detection limit determinations.

In some embodiments, a separate machine-readable medium 150 (e.g., a memory, such as a hard drive, a compact disk, a digital video disk, or a flash memory) may store the software instructions and/or configuration data which can be executed or accessed by a computer (e.g., a logic device or processor-based system) to perform various methods and operations, such as methods and operations associated with processing image data. In one aspect, the machine-readable medium 150 may be portable and/or located separate from the imaging device 105, with the stored software instructions and/or data provided to the imaging device 105 by coupling the machine-readable medium 150 to the imaging device 105 and/or by the imaging device 105 downloading (e.g., via a wired link and/or a wireless link) from the machine-readable medium 150. It should be appreciated that various modules may be integrated in software and/or hardware as part of the logic device 110, with code (e.g., software or configuration data) for the modules stored, for example, in the memory component 115.

The imaging device 105 may be a video and/or still camera to capture and process images and/or videos of a scene 175. The scene 175 may include an object 180. In this regard, the image capture component 120 of the imaging device 105 may be configured to capture images (e.g., still and/or video images) of the scene 175 in a particular spectrum or modality. The image capture component 120 includes an image detector circuit 165 (e.g., a visible-light detector circuit, a thermal infrared detector circuit) and a readout circuit 170 (e.g., an ROIC). For example, the image capture component 120 (e.g., an IR imager) may include an IR imaging sensor (e.g., IR imaging sensor array) configured to detect IR radiation in the near, middle, and/or far IR spectrum and provide IR images (e.g., IR image data or signal) representative of the IR radiation from the scene 175. For example, the image detector circuit 165 may capture (e.g., detect, sense) IR radiation with wavelengths in the range from around 700 nm to around 2 mm, or portion thereof. For example, in some aspects, the image detector circuit 165 may be sensitive to (e.g., better detect) SWIR radiation, mid-wave IR (MWIR) radiation (e.g., EM radiation with wavelength of 2 $\mu$m to 5 $\mu$m), and/or long-wave IR (LWIR) radiation (e.g., EM radiation with wavelength of 7 $\mu$m to 14 $\mu$m), or any desired IR wavelengths (e.g., generally in the 0.7 $\mu$m to 14 $\mu$m range). In other aspects, the image detector circuit 165 may capture radiation from one or more other wavebands of the EM spectrum, such as visible light, ultraviolet light, and so forth.

The image detector circuit 165 may capture image data (e.g., infrared image data) associated with the scene 175. To capture a detector output image, the image detector circuit 165 may detect image data of the scene 175 (e.g., in the form of EM radiation) received through an aperture 185 of the imaging device 105 and generate pixel values of the image based on the scene 175. An image may be referred to as a frame or an image frame. In some cases, the image detector circuit 165 may include an array of detectors (e.g., also referred to as an array of pixels) that can detect radiation of a certain waveband, convert the detected radiation into electrical signals (e.g., voltages, currents, etc.), and generate the pixel values based on the electrical signals. Each detector in the array may capture a respective portion of the image data and generate a pixel value based on the respective portion captured by the detector. The pixel value generated by the detector may be referred to as an output of the detector. By way of non-limiting examples, each detector may be a photodetector, such as an avalanche photodiode, an infrared photodetector, a quantum well infrared photodetector, a microbolometer, or other detector capable of converting EM radiation (e.g., of a certain wavelength) to a pixel value. The array of detectors may be arranged in rows and columns. In an embodiment, the image detector circuit 165 may receive energy flux (e.g., thermal infrared energy flux) from an object(s) in the scene 175 and convert the energy flux to data values indicative of temperatures of the object(s) in the scene 175. The imaging device 105 may be radiometrically calibrated to ensure accurate conversion from the amount of energy received by the image detector circuit 165 to the data values generated by the image detector circuit 165.

The detector output image may be, or may be considered, a data structure that includes pixels and is a representation of the image data associated with the scene 175, with each pixel having a pixel value that represents EM radiation emitted or reflected from a portion of the scene 175 and received by a detector that generates the pixel value. Based on context, a pixel may refer to a detector of the image detector circuit 165 that generates an associated pixel value or a pixel (e.g., pixel location, pixel coordinate) of the detector output image formed from the generated pixel values. In one example, the detector output image may be an infrared image (e.g., thermal infrared image). For a thermal infrared image (e.g., also referred to as a thermal image), each pixel value of the thermal infrared image may represent a temperature of a corresponding portion of the scene 175. In another example, the detector output image may be a visible-light image. In some embodiments, a temperature difference image and/or a detection threshold image may be determined based at least in part on the thermal infrared image.

In an aspect, the pixel values generated by the image detector circuit 165 may be represented in terms of digital count values generated based on the electrical signals obtained from converting the detected radiation. For example, in a case that the image detector circuit 165 includes or is otherwise coupled to an analog-to-digital (ADC) circuit, the ADC circuit may generate digital count values based on the electrical signals. For an ADC circuit that can represent an electrical signal using 14 bits, the digital count value may range from 0 to 16,383. In such cases, the pixel value of the detector may be the digital count value output from the ADC circuit. In other cases (e.g., in cases without an ADC circuit), the pixel value may be analog in nature with a value that is, or is indicative of, the value of the electrical signal. As an example, for infrared imaging, a larger amount of IR radiation being incident on and detected by the image detector circuit 165 (e.g., an IR image detector circuit) is associated with higher digital count values and higher temperatures.

The readout circuit 170 may be utilized as an interface between the image detector circuit 165 that detects the image data and the logic device 110 that processes the detected image data as read out by the readout circuit 170, with communication of data from the readout circuit 170 to the logic device 110 facilitated by the image interface 125. An image capturing frame rate may refer to the rate (e.g., detector output images per second) at which images are detected/output in a sequence by the image detector circuit 165 and provided to the logic device 110 by the readout circuit 170. The readout circuit 170 may read out the pixel values generated by the image detector circuit 165 in accordance with an integration time (e.g., also referred to as an integration period).

In various embodiments, a combination of the image detector circuit 165 and the readout circuit 170 may be, may include, or may together provide an FPA. Detectors of the image detector circuit 165 may be cooled or uncooled. In some aspects, the image detector circuit 165 may be a thermal image detector circuit that includes an array of microbolometers, and the combination of the image detector circuit 165 and the readout circuit 170 may be referred to as a microbolometer FPA. In some cases, the array of microbolometers may be arranged in rows and columns. The microbolometers may detect IR radiation and generate pixel values based on the detected IR radiation. For example, in some cases, the microbolometers may be thermal IR detectors that detect IR radiation in the form of heat energy and generate pixel values based on the amount of heat energy detected. The microbolometers may absorb incident IR radiation and produce a corresponding change in temperature in the microbolometers. The change in temperature is associated with a corresponding change in resistance of the microbolometers. With each microbolometer functioning as a pixel, a two-dimensional image or picture representation of the incident IR radiation can be generated by translating the changes in resistance of each microbolometer into a time-multiplexed electrical signal. The translation may be performed by the ROIC. The microbolometer FPA may include IR detecting materials such as amorphous silicon (a-Si), vanadium oxide ($VO_x$), a combination thereof, and/or other detecting material(s). In an aspect, for a microbolometer FPA, the integration time may be, or may be indicative of, a time interval during which the microbolometers are biased. In this case, a longer integration time may be associated with higher gain of the IR signal, but not more IR radiation being collected. The IR radiation may be collected in the form of heat energy by the microbolometers. In some cases, a microbolometer may be sensitive to at least the LWIR range.

In some cases, the image capture component 120 may include one or more optical components and/or one or more filters. The optical component(s) may include one or more windows, lenses, mirrors, beamsplitters, beam couplers, and/or other components to direct and/or focus radiation to the image detector circuit 165. The optical component(s) may include components each formed of material and appropriately arranged according to desired transmission characteristics, such as desired transmission wavelengths and/or ray transfer matrix characteristics. The filter(s) may be adapted to pass radiation of some wavelengths but substantially block radiation of other wavelengths. For example, the image capture component 120 may be an IR imaging device that includes one or more filters adapted to pass IR radiation of some wavelengths while substantially blocking IR radiation of other wavelengths (e.g., MWIR filters, thermal IR filters, and narrow-band filters). In this example, such filters may be utilized to tailor the image capture component 120 for increased sensitivity to a desired band of IR wavelengths, such as a band for facilitating detection of one or more specific gases. In an aspect, an IR imaging device may be referred to as a thermal imaging device when the IR imaging device is tailored for capturing thermal IR images. In some embodiments, thermal IR images may encompass IR radiation data associated with a wavelength range between around 0.7 µm and around 14 µm or a portion thereof. Other imaging devices, including IR imaging devices tailored for capturing infrared IR images outside the thermal range, may be referred to as non-thermal imaging devices.

In one specific, not-limiting example, the image capture component 120 may include an IR imaging sensor having an FPA of detectors responsive to IR radiation including near infrared (NIR), SWIR, MWIR, LWIR, and/or very-long wave IR (VLWIR) radiation. In some other embodiments, alternatively or in addition, the image capture component 120 may include a complementary metal oxide semiconductor (CMOS) sensor or a charge-coupled device (CCD) sensor that can be found in any consumer camera (e.g., visible light camera).

In some embodiments, the imaging system 100 includes a shutter 190. The shutter 190 may be operated to selectively inserted into an optical path between the scene 175 and the image capture component 120 to expose or block the aperture 185. In some cases, the shutter 190 may be moved (e.g., slid, rotated, etc.) manually (e.g., by a user of the imaging system 100) and/or via an actuator (e.g., controllable by the logic device 110 in response to user input or autonomously, such as an autonomous decision by the logic device 110 to perform a calibration of the imaging device 105). When the shutter 190 is outside of the optical path to expose the aperture 185, the electromagnetic radiation from the scene 175 may be received by the image detector circuit 165 (e.g., via one or more optical components and/or one or more filters). As such, the image detector circuit 165 captures images of the scene 175. The shutter 190 may be referred to as being in an open position or simply as being open. When the shutter 190 is inserted into the optical path to block the aperture 185, the electromagnetic radiation from the scene

175 is blocked from the image detector circuit 165. As such, the image detector circuit 165 captures images of the shutter 190. The shutter 190 may be referred to as being in a closed position or simply as being closed. In some cases, the shutter 190 may block the aperture 185 during a calibration process, in which the shutter 190 may be used as a uniform blackbody (e.g., a substantially uniform blackbody). In some cases, the shutter 190 may be temperature controlled to provide a temperature controlled uniform black body (e.g., to present a uniform field of radiation to the image detector circuit 165). For example, in some cases, a surface of the shutter 190 imaged by the image detector circuit 165 may be implemented by a uniform blackbody coating. In some cases, such as for an imaging device without a shutter or with a broken shutter or as an alternative to the shutter 190, a case or holster of the imaging device 105, a lens cap, a cover, a wall of a room, or other suitable object/surface may be used to provide a uniform blackbody (e.g., substantially uniform blackbody).

Other imaging sensors that may be embodied in the image capture component 120 include a photonic mixer device (PMD) imaging sensor or other time of flight (ToF) imaging sensor, LIDAR imaging device, RADAR imaging device, millimeter imaging device, positron emission tomography (PET) scanner, single photon emission computed tomography (SPECT) scanner, ultrasonic imaging device, or other imaging devices operating in particular modalities and/or spectra. It is noted that for some of these imaging sensors that are configured to capture images in particular modalities and/or spectra (e.g., infrared spectrum, etc.), they are more prone to produce images with low frequency shading, for example, when compared with a typical CMOS-based or CCD-based imaging sensors or other imaging sensors, imaging scanners, or imaging devices of different modalities.

The images, or the digital image data corresponding to the images, provided by the image capture component 120 may be associated with respective image dimensions (also referred to as pixel dimensions). An image dimension, or pixel dimension, generally refers to the number of pixels in an image, which may be expressed, for example, in width multiplied by height for two-dimensional images or otherwise appropriate for relevant dimension or shape of the image. Thus, images having a native resolution may be resized to a smaller size (e.g., having smaller pixel dimensions) in order to, for example, reduce the cost of processing and analyzing the images. Filters (e.g., a non-uniformity estimate) may be generated based on an analysis of the resized images. The filters may then be resized to the native resolution and dimensions of the images before being applied to the images.

The image interface 125 may include, in some embodiments, appropriate input ports, connectors, switches, and/or circuitry configured to interface with external devices (e.g., a remote device 155 and/or other devices) to receive images (e.g., digital image data) generated by or otherwise stored at the external devices. In an aspect, the image interface 125 may include a serial interface and telemetry line for providing metadata associated with image data. The received images or image data may be provided to the logic device 110. In this regard, the received images or image data may be converted into signals or data suitable for processing by the logic device 110. For example, in one embodiment, the image interface 125 may be configured to receive analog video data and convert it into suitable digital data to be provided to the logic device 110.

The image interface 125 may include various standard video ports, which may be connected to a video player, a video camera, or other devices capable of generating standard video signals, and may convert the received video signals into digital video/image data suitable for processing by the logic device 110. In some embodiments, the image interface 125 may also be configured to interface with and receive images (e.g., image data) from the image capture component 120. In other embodiments, the image capture component 120 may interface directly with the logic device 110.

The control component 130 includes, in one embodiment, a user input and/or an interface device, such as a rotatable knob (e.g., potentiometer), push buttons, slide bar, keyboard, and/or other devices, that is adapted to generate a user input control signal. The logic device 110 may be configured to sense control input signals from a user via the control component 130 and respond to any sensed control input signals received therefrom. The logic device 110 may be configured to interpret such a control input signal as a value, as generally understood by one skilled in the art. In one embodiment, the control component 130 may include a control unit (e.g., a wired or wireless handheld control unit) having push buttons adapted to interface with a user and receive user input control values. In one implementation, the push buttons and/or other input mechanisms of the control unit may be used to control various functions of the imaging device 105, such as calibration initiation and/or related control, shutter control, autofocus, menu enable and selection, field of view, brightness, contrast, noise filtering, image enhancement, and/or various other features. In some embodiments, the control component 130 may receive user input/instructions (e.g., one or more presses of a button, a sliding of a sliding button, a gesture input on a touchscreen, etc.) to set the imaging device 105 (e.g., the logic device 110) to an operational mode to cause generation and, in some cases, display of thermal images, temperature difference images, and/or detection threshold images.

The display component 135 includes, in one embodiment, an image display device (e.g., a liquid crystal display (LCD)) or various other types of generally known video displays or monitors. The logic device 110 may be configured to display image data and information on the display component 135. The logic device 110 may be configured to retrieve image data and information from the memory component 115 and display any retrieved image data and information on the display component 135. The display component 135 may include display circuitry, which may be utilized by the logic device 110 to display image data and information. The display component 135 may be adapted to receive image data and information directly from the image capture component 120, logic device 110, and/or image interface 125, or the image data and information may be transferred from the memory component 115 via the logic device 110. In some aspects, the control component 130 may be implemented as part of the display component 135. For example, a touchscreen of the imaging device 105 may provide both the control component 130 (e.g., for receiving user input via taps and/or other gestures) and the display component 135 of the imaging device 105. In some embodiments, the display component 135 may selectively display a radiometric/temperature image (e.g., a thermal infrared image having pixels that represent temperatures), a temperature difference image, and/or a detection threshold image, such as in response to user input/instructions.

The sensing component 140 includes, in one embodiment, one or more sensors of various types, depending on the application or implementation requirements, as would be understood by one skilled in the art. Sensors of the sensing component 140 provide data and/or information to at least the logic device 110. In one aspect, the logic device 110 may be configured to communicate with the sensing component 140. In various implementations, the sensing component 140 may provide information regarding environmental conditions, such as outside temperature (e.g., ambient temperature), lighting conditions (e.g., day, night, dusk, and/or dawn), humidity level, specific weather conditions (e.g., sun, rain, and/or snow), distance (e.g., laser rangefinder or time-of-flight camera), and/or whether a tunnel or other type of enclosure has been entered or exited. The sensing component 140 may represent conventional sensors as generally known by one skilled in the art for monitoring various conditions (e.g., environmental conditions) that may have an effect (e.g., on the image appearance) on the image data provided by the image capture component 120.

In some implementations, the sensing component 140 (e.g., one or more sensors) may include devices that relay information to the logic device 110 via wired and/or wireless communication. For example, the sensing component 140 may be adapted to receive information from a satellite, through a local broadcast (e.g., radio frequency (RF)) transmission, through a mobile or cellular network and/or through information beacons in an infrastructure (e.g., a transportation or highway information beacon infrastructure), or various other wired and/or wireless techniques. In some embodiments, the logic device 110 can use the information (e.g., sensing data) retrieved from the sensing component 140 to modify a configuration of the image capture component 120 (e.g., adjusting a light sensitivity level, adjusting a direction or angle of the image capture component 120, adjusting an aperture, etc.). The sensing component 140 may include a temperature sensing component to provide temperature data (e.g., one or more measured temperature values) various components of the imaging device 105, such as the image detection circuit 165 and/or the shutter 190. By way of non-limiting examples, a temperature sensor may include a thermistor, thermocouple, thermopile, pyrometer, and/or other appropriate sensor for providing temperature data.

In some embodiments, various components of the imaging system 100 may be distributed and in communication with one another over a network 160. In this regard, the imaging device 105 may include a network interface 145 configured to facilitate wired and/or wireless communication among various components of the imaging system 100 over the network 160. In such embodiments, components may also be replicated if desired for particular applications of the imaging system 100. That is, components configured for same or similar operations may be distributed over a network. Further, all or part of any one of the various components may be implemented using appropriate components of the remote device 155 (e.g., a conventional digital video recorder (DVR), a computer configured for image processing, and/or other device) in communication with various components of the imaging system 100 via the network interface 145 over the network 160, if desired. Thus, for example, all or part of the logic device 110, all or part of the memory component 115, and/or all of part of the display component 135 may be implemented or replicated at the remote device 155. In some embodiments, the imaging system 100 may not include imaging sensors (e.g., image capture component 120), but instead receive images or image data from imaging sensors located separately and remotely from the logic device 110 and/or other components of the imaging system 100. It will be appreciated that many other combinations of distributed implementations of the imaging system 100 are possible, without departing from the scope and spirit of the disclosure.

Furthermore, in various embodiments, various components of the imaging system 100 may be combined and/or implemented or not, as desired or depending on the application or requirements. In one example, the logic device 110 may be combined with the memory component 115, image capture component 120, image interface 125, display component 135, sensing component 140, and/or network interface 145. In another example, the logic device 110 may be combined with the image capture component 120, such that certain functions of the logic device 110 are performed by circuitry (e.g., a processor, a microprocessor, a logic device, a microcontroller, etc.) within the image capture component 120. In another example, the imaging system 100 does not include the sensing component 140.

In some embodiments, the imaging system 100 may be used to detect one or more gases of interest within the scene 175. The object 180 may be a gas. The image capture component 120 may capture one or more images of the scene 175 in response to infrared radiation received from the scene 175. The infrared radiation may correspond to wavelengths that are emitted and/or absorbed by the object 180 within the scene 175, and other wavelengths that are emitted and/or absorbed by other objects within the scene 175. Examples of gas detection techniques are provided in U.S. Patent Application Publication No. 2020/0116583 and U.S. Pat. Nos. 10,416,076, 11,035,786, and 11,092,507, which are all incorporated by reference in their entirety.

Although the object 180 is a gas in some embodiments, the object 180 may generally be any object of interest dependent on application. As non-limiting examples, the object 180 may be a car (e.g., generally any car or a specific car), a person (e.g., generally any person or a specific person), an aerial vehicle, or generally any other object of interest dependent on application. In some aspects, the imaging system 100 may include object identification/detection capability (e.g., in the logic device 110) and/or may be coupled to a system/device having object identification/detection capability (e.g., the system/device receives image data from the imaging system 100 and performs object identification/detection on the received image data).

FIG. 2 illustrates a block diagram of an example image sensor assembly 200 in accordance with one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided. In an embodiment, the image sensor assembly 200 may be an FPA, for example, implemented as the image capture component 120 of FIG. 1.

The image sensor assembly 200 includes a unit cell array 205, column multiplexers 210 and 215, column amplifiers 220 and 225, a row multiplexer 230, control bias and timing circuitry 235, a digital-to-analog converter (DAC) 240, and a data output buffer 245. In some aspects, operations of and/or pertaining to the unit cell array 205 and other components may be performed according to a system clock and/or synchronization signals (e.g., line synchronization (LSYNC) signals). The unit cell array 205 includes an array of unit cells. In an aspect, each unit cell may include a detector (e.g., a pixel) and interface circuitry. The interface circuitry of each unit cell may provide an output signal, such as an output voltage or an output current, in response to a detection signal (e.g., detection current, detection voltage) provided by the detector of the unit cell. The output signal may be indicative of the magnitude of EM radiation received by the detector and may be referred to as image pixel data or simply image data. The column multiplexer 215, column amplifiers 220, row multiplexer 230, and data output buffer 245 may be used to provide the output signals from the unit cell array 205 as a data output signal on a data output line 250. The output signals on the data output line 250 may be provided to components downstream of the image sensor assembly 200, such as processing circuitry (e.g., the logic device 110 of FIG. 1), memory (e.g., the memory component 115 of FIG. 1), display device (e.g., the display component 135 of FIG. 1), and/or other component to facilitate processing, storage, and/or display of the output signals. The data output signal may be an image formed of the pixel values for the image sensor assembly 200. In this regard, the column multiplexer 215, the column amplifiers 220, the row multiplexer 230, and the data output buffer 245 may collectively provide an ROIC (or portion thereof) of the image sensor assembly 200. In an aspect, the interface circuitry may be considered part of the ROIC, or may be considered an interface between the detectors and the ROIC. In some embodiments, components of the image sensor assembly 200 may be implemented such that the unit cell array 205 and the ROIC may be part of a single die.

The column amplifiers 225 may generally represent any column processing circuitry as appropriate for a given application (analog and/or digital), and is not limited to amplifier circuitry for analog signals. In this regard, the column amplifiers 225 may more generally be referred to as column processors in such an aspect. Signals received by the column amplifiers 225, such as analog signals on an analog bus and/or digital signals on a digital bus, may be processed according to the analog or digital nature of the signal. As an example, the column amplifiers 225 may include circuitry for processing digital signals. As another example, the column amplifiers 225 may be a path (e.g., no processing) through which digital signals from the unit cell array 205 traverses to get to the column multiplexer 215. As another example, the column amplifiers 225 may include an ADC for converting analog signals to digital signals (e.g., to obtain digital count values). These digital signals may be provided to the column multiplexer 215.

Each unit cell may receive a bias signal (e.g., bias voltage, bias current) to bias the detector of the unit cell to compensate for different response characteristics of the unit cell attributable to, for example, variations in temperature, manufacturing variances, and/or other factors. For example, the control bias and timing circuitry 235 may generate the bias signals and provide them to the unit cells. By providing appropriate bias signals to each unit cell, the unit cell array 205 may be effectively calibrated to provide accurate image data in response to light (e.g., visible-light, IR light) incident on the detectors of the unit cells. In an aspect, the control bias and timing circuitry 235 may be, may include, or may be a part of, a logic circuit.

The control bias and timing circuitry 235 may generate control signals for addressing the unit cell array 205 to allow access to and readout of image data from an addressed portion of the unit cell array 205. The unit cell array 205 may be addressed to access and readout image data from the unit cell array 205 row by row, although in other implementations the unit cell array 205 may be addressed column by column or via other manners.

The control bias and timing circuitry 235 may generate bias values and timing control voltages. In some cases, the DAC 240 may convert the bias values received as, or as part of, data input signal on a data input signal line 255 into bias signals (e.g., analog signals on analog signal line(s) 260) that may be provided to individual unit cells through the operation of the column multiplexer 210, column amplifiers 220, and row multiplexer 230. For example, the DAC 240 may drive digital control signals (e.g., provided as bits) to appropriate analog signal levels for the unit cells. In some technologies, a digital control signal of 0 or 1 may be driven to an appropriate logic low voltage level or an appropriate logic high voltage level, respectively. In another aspect, the control bias and timing circuitry 235 may generate the bias signals (e.g., analog signals) and provide the bias signals to the unit cells without utilizing the DAC 240. In this regard, some implementations do not include the DAC 240, data input signal line 255, and/or analog signal line(s) 260. In an embodiment, the control bias and timing circuitry 235 may be, may include, may be a part of, or may otherwise be coupled to the logic device 110 and/or image capture component 120 of FIG. 1.

In an embodiment, the image sensor assembly 200 may be implemented as part of an imaging device (e.g., the imaging device 105). In addition to the various components of the image sensor assembly 200, the imaging device may also include one or more processors, memories, logic, displays, interfaces, optics (e.g., lenses, mirrors, beamsplitters), and/ or other components as may be appropriate in various implementations. In an aspect, the data output signal on the data output line 250 may be provided to the processors (not shown) for further processing. For example, the data output signal may be an image formed of the pixel values from the unit cells of the image sensor assembly 200. The processors may perform operations such as non-uniformity correction (e.g., flat-field correction or other calibration technique), spatial and/or temporal filtering, and/or other operations. The images (e.g., processed images) may be stored in memory (e.g., external to or local to the imaging system) and/or displayed on a display device (e.g., external to and/or integrated with the imaging system). The various components of FIG. 2 may be implemented on a single chip or multiple chips. Furthermore, while the various components are illustrated as a set of individual blocks, various of the blocks may be merged together or various blocks shown in FIG. 2 may be separated into separate blocks.

It is noted that in FIG. 2 the unit cell array 205 is depicted as an 8×8 (e.g., 8 rows and 8 columns of unit cells. However, the unit cell array 205 may be of other array sizes. By way of non-limiting examples, the unit cell array 205 may include 512×512 (e.g., 512 rows and 512 columns of unit cells), 1024×1024, 2048×2048, 4096×4096, 8192×8192, and/or other array sizes. In some cases, the array size may have a row size (e.g., number of detectors in a row) different from a column size (e.g., number of detectors in a column). Examples of frame rates may include 30 Hz, 60 Hz, and 120 Hz. In an aspect, each unit cell of the unit cell array 205 may represent a pixel.

Figure 3:
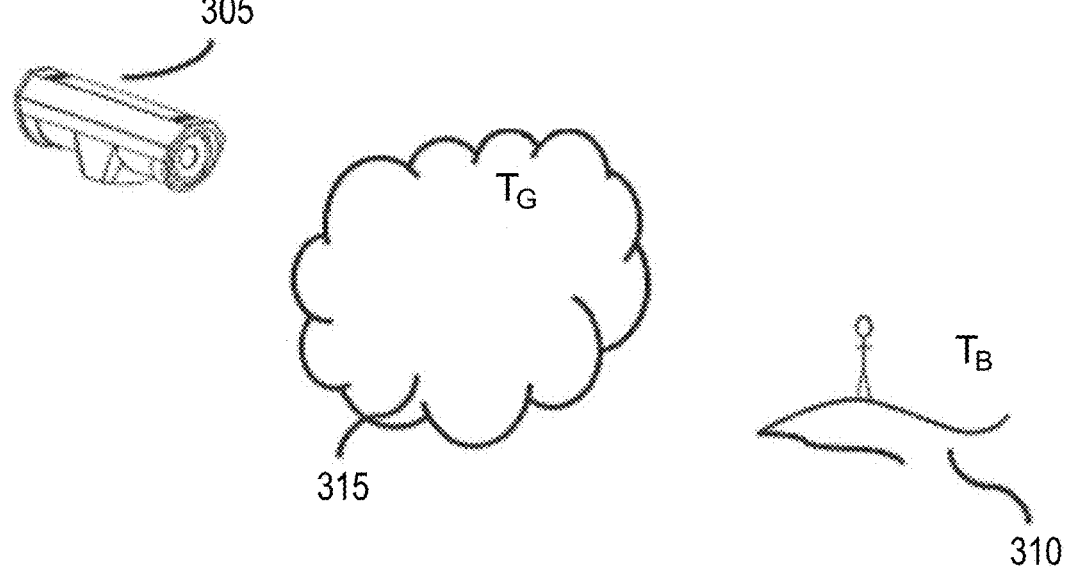
FIG. 3 illustrates a schematic view of imaging of gas in accordance with one or more embodiments of the present disclosure.

FIG. 3 illustrates a schematic view of imaging of gas in accordance with one or more embodiments of the present disclosure. A thermal imaging device 305 may capture infrared radiation within a particular wavelength band(s) and produce infrared images representing radiation within the particular wavelength band(s) from a scene. In an embodiment, the thermal imaging device 305 may be, may include, or may be a part of the imaging device 105 of FIG. 1. In FIG. 3, the scene includes a background 310 (also referred to as a background component/portion) and a gas 315 (also referred to as a gas component/portion). The gas 315 is present between the thermal imaging device 305 and the background 310 of the scene. For example, the gas 315 may be a gas cloud with a gas concentration in parts per million (ppm) and with a width along a path from the background 310 to the thermal imaging device 305. In an aspect, the background 310 may encompass all aspects of the scene aside from the gas 315 (e.g., the object/feature of interest monitored for in the scene). In this regard, background radiation refers to radiation that is associated with the background 310 and not associated with radiation of a gas(es) of interest, such as radiation of the gas 315 in FIG. 3. The background 310 of the scene has a background temperature $T_B$ and the gas 315 has a gas temperature $T_G$. A temperature difference, denoted as $\Delta T$ and also referred to as a background-to-gas temperature difference, may be determined based on the background temperature $T_B$ and the gas temperature $T_G$.

In some cases, the gas temperature $T_G$ may be determined/ estimated based on a measured ambient air temperature (e.g., from an ambient air temperature sensor) and/or based on an infrared image that provides an intensity of infrared radiation within a first wavelength band that includes wavelengths of infrared radiation with high absorptance values for a gas(es) of interest in an absorption spectrum and/or low transmittance values in a transmission spectrum. In other words, this first wavelength band is a high absorption wavelength band that includes wavelengths sensitive to (e.g., significantly affected by) the presence of the gas(es) of interest to be imaged/detected. In some cases, the gas temperature $T_G$ may be provided by or based on measurements from an external temperature sensor, local weather information (e.g., available online), and/or other sources. In some cases, the background temperature $T_B$ may be based on a background infrared image that includes a representation of an intensity of the infrared radiation within a second wavelength band that includes wavelengths of infrared radiation with low absorptance values for the gas(es) of interest in an absorption spectrum and/or high transmittance values in a transmission spectrum. In other words, this second wavelength band is a low absorption wavelength band and/or a high transmission wavelength band that includes wavelengths not sensitive to (e.g., insignificantly affected by) the presence of the gas(es) to be imaged/ detected. For example, the background infrared image may capture a scene known not to have a gas of interest (e.g., based on not being associated with a wavelength band sensitive to a gas of interest). In some cases, an ambient temperature may be estimated. The thermal imaging device 305 may have several integrated temperature sensors and use various techniques, such as machine learning, neural network, and/or filtering techniques (e.g., Kalman filtering), to estimate the ambient temperature. As would be understood by one skilled in the art, the techniques discussed herein and various techniques for determining the gas temperature and the background temperature, such as for example provided in U.S. Pat. Nos. 10,416,076 and 11,035, 786, may be utilized in accordance with one or more embodiments.

Figures 4, 5:
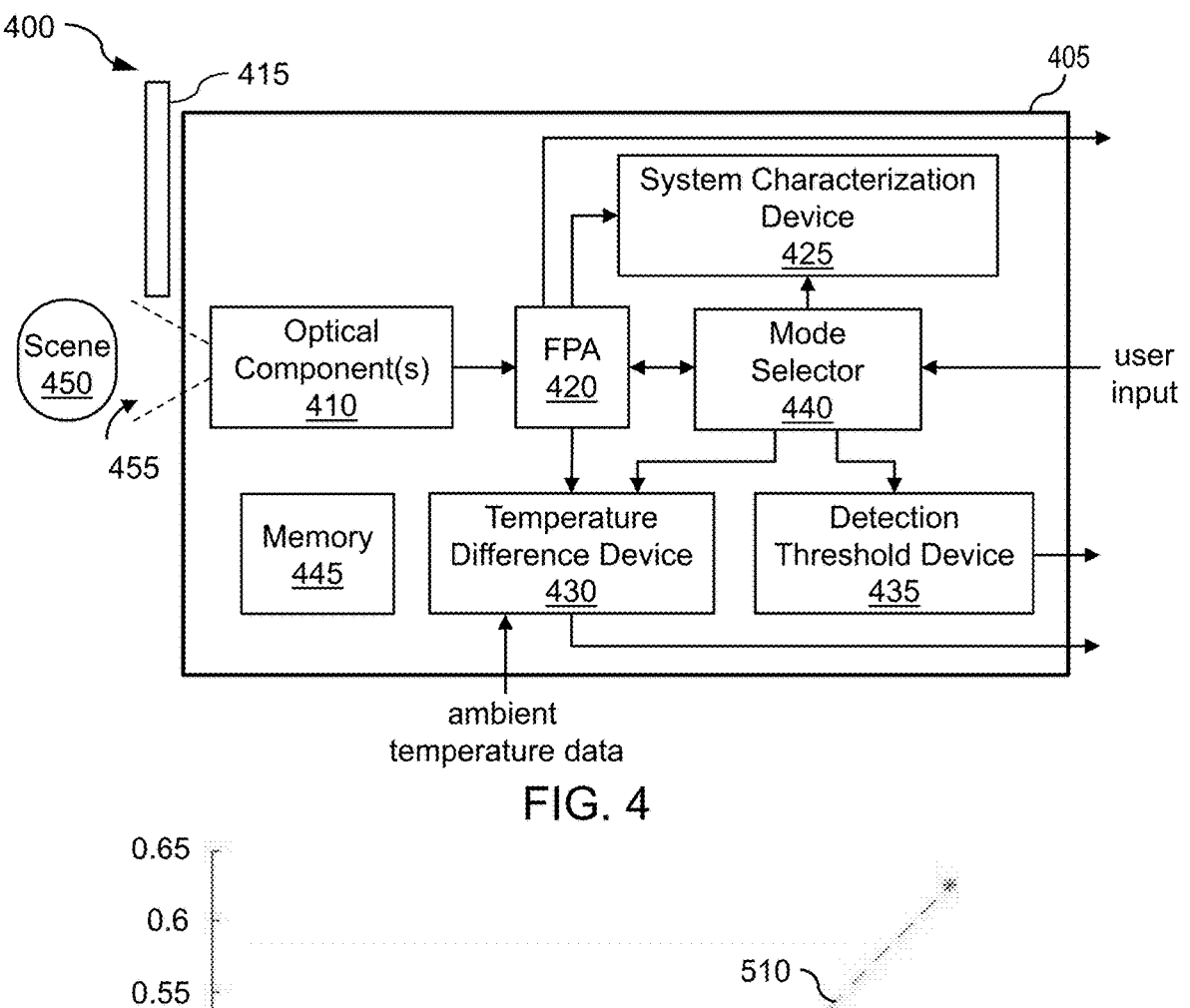
FIG. 4 illustrates an example system for facilitating detection threshold determination and other imaging processes in accordance with one or more embodiments of the present disclosure.
FIG. 5 illustrates a graph of sensitivity characteristics that characterize an imaging system in accordance with one or more embodiments of the present disclosure.

FIG. 4 illustrates an example system 400 for facilitating detection threshold determination and other processes for infrared imaging in accordance with one or more embodiments of the present disclosure. The system 400 may be, or may be a part of, an infrared imaging system used to capture and process images. In an embodiment, the infrared imaging system may be, may include, or may be a part of, the imaging system 100 of FIG. 1 and/or the thermal imaging device 305 of FIG. 3. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided.

The system 400 includes a housing 405 (e.g., a camera body), one or more optical components 410, a shutter 415, an FPA 420, a system characterization device 425, a temperature difference device 430, a detection threshold device 435 (e.g., also referred to as a detection limit device), a mode selector 440, and a memory 445. In an embodiment, the optical component(s) 410, the shutter 415, the FPA 420, the system characterization device 425, the temperature difference device 430, the detection threshold device 435, the mode selector 440, and/or the memory 445 may be implemented using one or more processing circuits on a single chip or distributed across two or more chips.

The housing 405 may house the optical component(s) 410, the shutter 415, the FPA 420, the temperature difference device 430, the detection threshold device 435, the mode selector 440, and/or the memory 445. Although the optical component(s) 410, the FPA 420, the temperature difference device 430, the detection threshold device 435, the mode selector 440, and the memory 445 are disposed within the housing 405 in FIG. 4, fewer, more, and/or different components may be disposed within the housing 405. In an aspect, the housing 405 may house at least the optical component(s) 410 and the FPA 420. The shutter 415, the temperature difference device 430, the detection threshold device 435, the mode selector 440, and/or the memory 445 may be disposed within the housing 405 or external to the housing 405.

The optical component(s) 410 may receive electromagnetic radiation from a scene 450 through an aperture 455 of the system 400 and pass the electromagnetic radiation to the FPA 420. For example, the optical component(s) 410 may direct and/or focus electromagnetic radiation on the FPA 420. The optical component(s) 410 may include one or more windows, lenses, mirrors, beamsplitters, beam couplers, and/or other components. The optical component(s) 410 may include components each formed of material and appropriately arranged according to desired transmission characteristics, such as desired transmission wavelengths and/or ray transfer matrix characteristics.

The shutter 415 may be operated to selectively expose or block the aperture 455. When the shutter 415 is positioned to expose the aperture 455, the electromagnetic radiation from the scene 450 may be received and directed by the optical component(s) 410. When the shutter 415 is positioned to block the aperture 455, the electromagnetic radiation from the scene 450 is blocked from the optical component(s) 410. In some cases, the shutter 415 may block the aperture 455 during a calibration process, in which the shutter 415 may be used as a uniform blackbody. Calibration data (e.g., gain maps, offset maps, etc.) determined during a calibration process may be stored in the memory 445.

The FPA 420 includes a detector array and an ROIC. In an embodiment, the FPA 420 may be implemented by the imaging capture component 120. The FPA 420 may receive the electromagnetic radiation from the optical component(s) 410 and capture image data based on the electromagnetic radiation (e.g., infrared component of the electromagnetic radiation). In an aspect, the detector array is an infrared detector array (e.g., microbolometer array) that detects IR radiation (e.g., thermal IR radiation). The image data may include infrared data values (e.g., thermal infrared data values). As an example, the FPA 420 may include or may be coupled to an ADC circuit that generates infrared data values based on infrared radiation. A 16-bit ADC circuit may generate infrared data values that range from 0 to 65,535. The infrared data values may provide temperatures for different portions of the scene 450, such as provide temperatures of objects (e.g., gases), persons, and/or other aspects in the scene 450.

The infrared image data may be represented in an image according to a palette, such that a visual representation value (e.g., color value or grayscale value) of each pixel of the image is indicative of a temperature associated with that pixel. For example, a temperature associated with an object in the scene 450 may be represented in pixels (e.g., a subset of pixels) of an infrared image (e.g., a thermal infrared image) that correspond to the object. In some cases, the object in the scene 450 may be a gas of interest (e.g., dependent on application). The infrared image data may be displayed (e.g., to a user), stored, and/or processed.

In some aspects, data derived from the infrared image data, such as temperature difference data and detection limit data as further described herein, may be represented in an image according to a palette. For example, the temperature difference data may be represented in an image according to a palette such that a visual representation value (e.g., color value or grayscale value) of each pixel of the image is indicative of a background-to-gas temperature difference associated with the pixel. For example, the detection threshold data may be represented in an image according to a palette such that a visual representation value (e.g., color value or grayscale value) of each pixel of the image is indicative of a detection threshold value (e.g., a lowest detectable concentration length) associated with the pixel.

The system characterization device 425 may receive the image data (e.g., the infrared data values) generated by the FPA 420. The system characterization device 425 may determine metrics for characterizing the system 400 or component thereof (e.g., the FPA 420) based on the image data from the FPA 420 (e.g., provided as one or more images in some cases). The metrics may include sensitivity characteristics. In an embodiment, the metrics may be measured using measurement procedures described by standards. In some aspects, the metrics may include MRTD measurements that characterize thermal sensitivity/resolution and spatial sensitivity/resolution associated with the system 400 (e.g., primarily related to the FPA 420 of the system 400). The MRTD measurements may be made according to methods set forth by the ASTM (e.g., capturing and analyzing images of a four-bar target). In some cases, the MRTD measurements may be made for different spatial frequencies (e.g., spatial frequencies relevant to an application), different temperature spans of an image, and/or other variables. Values determined for the metrics may be stored in the memory 445 and retrieved from the memory 445, such as for computations associated with the detection threshold device 435. As an example, FIG. 5 illustrates a graph 500 of a relationship between MRTDs and spatial frequencies for characterizing the system 400 in accordance with one or more embodiments of the present disclosure. The graph 500 includes an MRTD curve 505 associated with MRTD vs. spatial frequency relationships with a digital filter of the system 400 turned off (e.g., bypassed or otherwise not used to filter image data) and an MRTD curve 510 with the digital filter turned on. As such, the digital filter affects an MRTD curve of the system 400. More generally, for a given imaging system, certain image processing (e.g., image enhancements) may affect the imaging system's MRTD curve.

The temperature difference device 430 may determine temperature data of the image data (e.g., the infrared data values) generated by the FPA 420 that is associated with a background of the scene 450 (e.g., associated with background radiation), temperature data of the image data generated by the FPA 420 that is associated with gas detection in the scene 450, and temperature data indicative of a difference between the temperature data associated with the background and the temperature data associated with gas detection. In an aspect, the temperature data indicative of such a difference may be referred to as background-to-gas temperature difference data or simply temperature difference data. For example, the scene 450 may be the scene provided in FIG. 3, which includes the background 310 of the scene and the gas 315 of the scene. In this example, the temperature difference device 430 may determine the temperature data associated with the background 310, the temperature data associated with the gas 315 (e.g., in association with gas detection), and the temperature data indicative of the difference of the temperature data associated with the background 310 and the temperature data associated with the gas 315. When the image data does not include a gas, or does not include a gas that affects the background temperature, the difference may be substantially zero. In some aspects, the temperature difference data may be represented in a temperature difference image/map (e.g., denoted as a ΔT image or dT image) and processed, stored, and/or displayed to the user.

In some cases, the temperature data associated with the gas in the scene 450 may be, or may be based on, ambient temperature data. The ambient temperature data may be, may include, or may be indicative of an ambient temperature (e.g., external temperature, air temperature) surrounding the system 400. The ambient temperature data may be obtained as a temperature measurement(s) from an external/ambient temperature sensor(s), available weather information (e.g., from online weather databases) when the thermal image is captured, using image algorithms, and/or other data. The temperature measurement(s) may be provided to the temperature difference device 430 (e.g., via wired and/or wireless communication).

The detection threshold device 435 determines detection threshold data based on sensitivity characteristics that characterize the system 400 and the temperature difference data. In some aspects, the detection threshold data may be, may include, or may be indicative of lowest detectable concentration lengths (e.g., in units of ppmm). The detection threshold data may be based on relationships between a detection threshold metric (e.g., a lowest concentration length that can be detected), a sensitivity characteristic (e.g., MRTD value), and the temperature difference data (e.g., indicating background-to-gas temperature difference). Such relationships may be determined during calibration and/or procedures to measure performance characteristics of the system 400 and represented as lookup tables, maps/images, equations, etc. In some cases, such relationships may be stored in the memory 445. In some cases, the detection threshold data may be determined based on other factors. As non-limiting examples, the detection threshold data may be determined based on a spatial noise/modulation of the background and/or a span (e.g., temperature span) associated with the image data. For example, the detection threshold device 435 and/or other device may determine spatial noise/modulation of the background may be determined/calculated locally in image data or an image represented by image data. In some aspects, the detection threshold data may be represented in a detection threshold image/map and processed, stored, and/or displayed to the user.

The mode selector 440 may generate control signals and transmit them to the FPA 420, the system characterization device 425, the temperature difference device 430, and/or the detection threshold device 435 to control operation of the FPA 420, the system characterization device 425, the temperature difference device 430, and/or the detection threshold device 435. The mode selector 440 may cause the image data (e.g., or an image generated from the image data) to be routed to a display device (e.g., for display to a user) and/or to the system characterization device 425, the temperature difference device 430, the detection threshold device 435, and/or the memory 445, as further described below. In an embodiment, the system characterization device 425, the temperature difference device 430, the detection threshold device 435, and/or the mode selector 440 may be implemented by the logic device 110.

As one example, the mode selector 440 may set the FPA 420 to capture image data/images for storage, processing, and/or display. In some cases, the system characterization device 425, the temperature difference device 430, and/or the detection threshold device 435 may be turned off or placed in a low power mode (e.g., standby mode). In an aspect, a default imaging mode or simply an imaging mode may refer to an operation mode in which the FPA 420 is operated to capture image data/images. The image data captured by the FPA 420 may be displayed (e.g., as one or more images) to the user if desired by the user.

As another example, the mode selector 440 may cause the FPA 420 and the system characterization device 425 to operate to determine metrics for characterizing the system 400. The metrics may include sensitivity characteristics, such as MRTD characteristics. In an aspect, a system characterization mode may refer to an operation mode in which the FPA 420 and the system characterization device 425 are operated to determine (e.g., measure) system metrics.

As another example, the mode selector 440 may cause the FPA 420 and the temperature difference device 430 to operate to determine temperature difference data. The temperature difference data may be determined based on the image data/images from the FPA 420 and the ambient temperature data. In an aspect, a temperature difference mode may refer to an operation mode in which the FPA 420 and the temperature difference device 430 are operated to determine temperature difference data. The temperature difference data determined by the temperature difference device 430 may be displayed (e.g., as one or more temperature difference images) to the user if desired by the user.

As another example, the mode selector 440 may cause the FPA 420 and the detection threshold device 435 to operate to determine detection threshold data. The detection threshold data may be determined based on the image data/images from the FPA 420. In some cases, the detection threshold device 435 may receive the temperature difference data from the temperature difference device 430 and determine the detection limit data further based on the temperature difference data. In an aspect, a detection threshold mode may refer to an operation mode in which the FPA 420 and the detection threshold device 435 are operated to determine detection threshold data. The detection threshold data determined by the detection threshold device 435 may be displayed (e.g., as one or more detection threshold images) to the user if desired by the user.

In some embodiments, the mode selector 440 may receive user input and generate control signals to control operation of the FPA 420, the system characterization device 425, the temperature difference device 430, and/or the detection threshold device 435 based on the user input. The user input may include an indication of which images are to be generated and/or displayed to the user. For example, the user input may include an indication/instruction to display an infrared image generated by the FPA 420, a temperature difference image generated by the temperature difference device 430, and/or a detection threshold image generated by the detection threshold device 435. In some cases, the user input may include an indication of how to display the infrared image, the temperature difference image, and/or the detection threshold image. For example, the user input may indicate to display the infrared image and the detection threshold image side-by-side on a display device. In some embodiments, an indication of the user input may be provided to the mode selector 440 by the control component 130. The control component 130 may receive user input/instructions (e.g., one or more presses of button, sliding of a sliding button, a gesture on a touchscreen, etc.) regarding which images to generate and/or display to the user and generate the indication of the user input for processing by the mode selector 440.

In some cases, based on the images that the user desires to be displayed to the user, various computations of the FPA 420, the temperature difference device 430, and/or the detection threshold device 435 may not need to be performed, which may allow for lower computational costs and/or lower resource costs (e.g., power, memory) as non-limiting examples. As one example, when the user input indicates to display just the detection threshold image, the FPA 420 and the temperature difference device 430 may avoid computations associated with applying a respective palette to the infrared data values and the temperature difference data values, respectively. As another example, when the user input indicates to display just the infrared image generated by the FPA 420, the temperature difference device 430 and the detection threshold device 435 may be powered off or operated in a lower power mode (e.g., standby mode) until user instructions change. In some cases, the user and/or the system 400 may cause performing of such computations for storage and/or further processing, such as for later retrieval and analysis, even when the user does not request to view certain images. In some cases, the system 400 may provide an interface device (e.g., a button, a digital control interface) that allows the user to toggle between displaying different image types (e.g., thermal image, temperature difference image, detection limit image) upon request (e.g., displayed image changes in real time responsive to user request) and/or select multiple image types for simultaneous display.

The memory 445 may store data generated by and for facilitating operation of the FPA 420, the system characterization device 425, the temperature difference device 430, the detection threshold device 435, and the mode selector 440. In this regard, although connectors are not explicitly shown in FIG. 4, the memory 445 may be coupled to the FPA 420, the system characterization device 425, the temperature difference device 430, the detection threshold device 435, and/or the mode selector 440. Such coupling may be via wired connections (e.g., inter-chip and/or intra-chip connections) and/or wireless connections. By way of non-limiting examples, the memory 445 may store calibration data associated with the system 400, sensitivity characteristics associated with the system 400, information associated with the scene 450 (e.g., ambient temperature, humidity, etc.), thermal image data and/or thermal images, temperature difference data and/or temperature difference images, detection threshold data and/or detection threshold images, metadata (e.g., time stamps, data source) associated with any stored data, and/or other data. In an embodiment, the memory 445 may be implemented by the memory component 115.

Figure 6A:
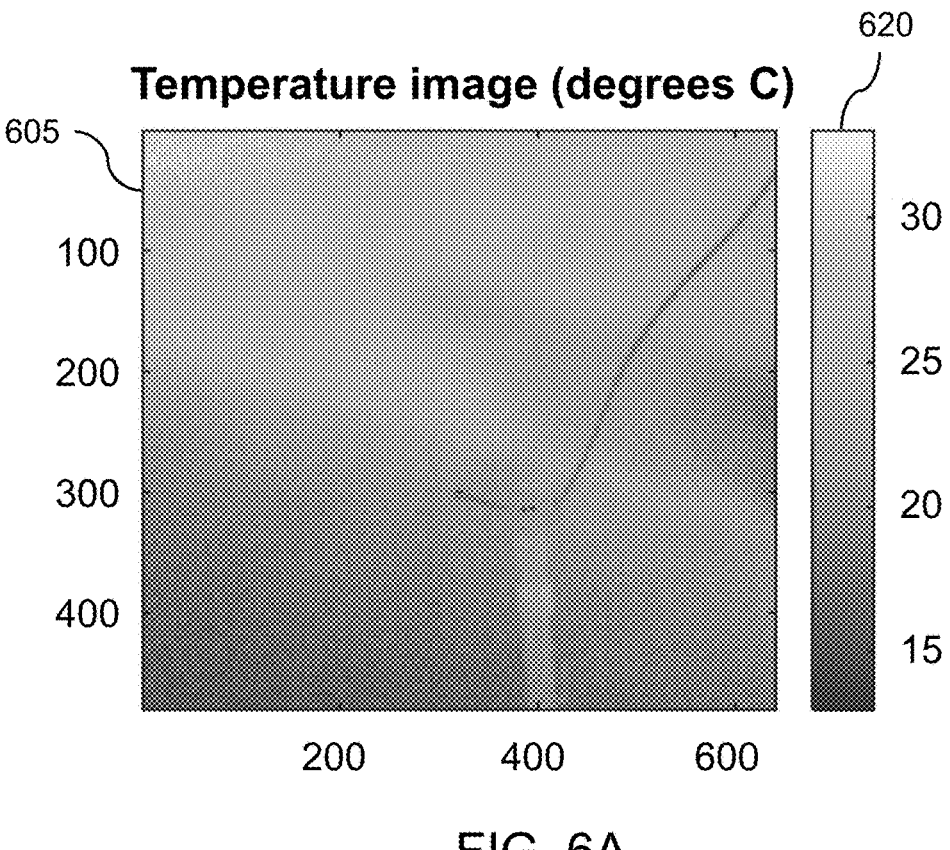
FIG. 6A illustrates an example thermal image in accordance with one or more embodiments of the present disclosure.
Figure 6B:
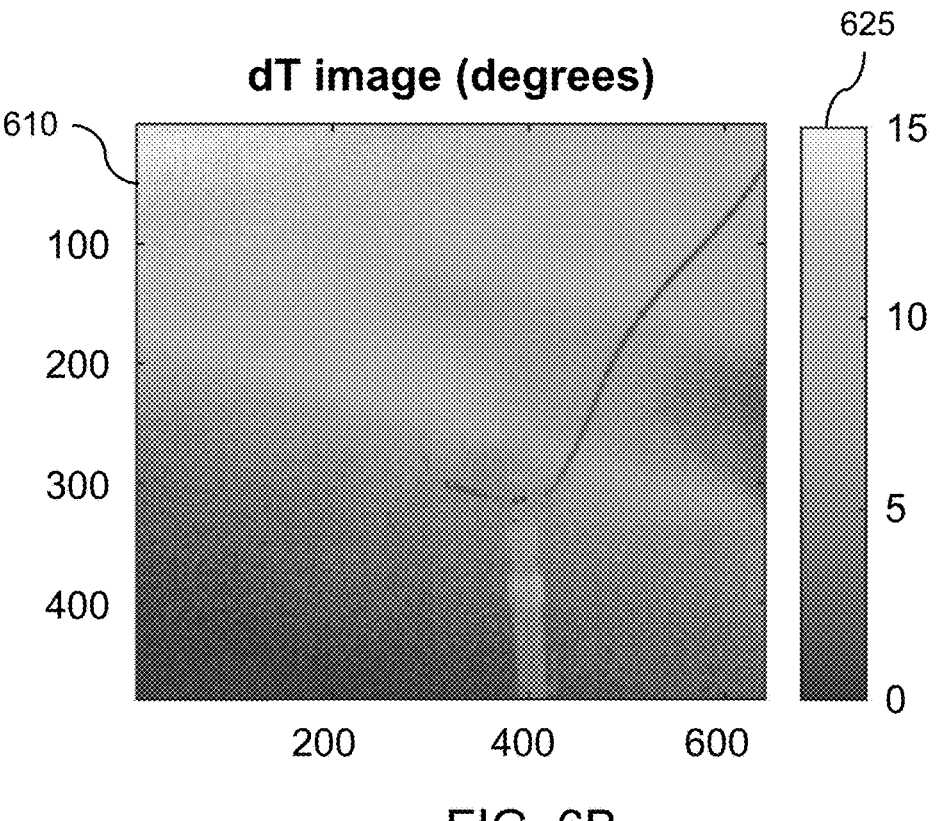
FIG. 6B illustrates an example temperature difference image associated with the thermal image of FIG. 6A in accordance with one or more embodiments of the present disclosure.
Figure 6C:
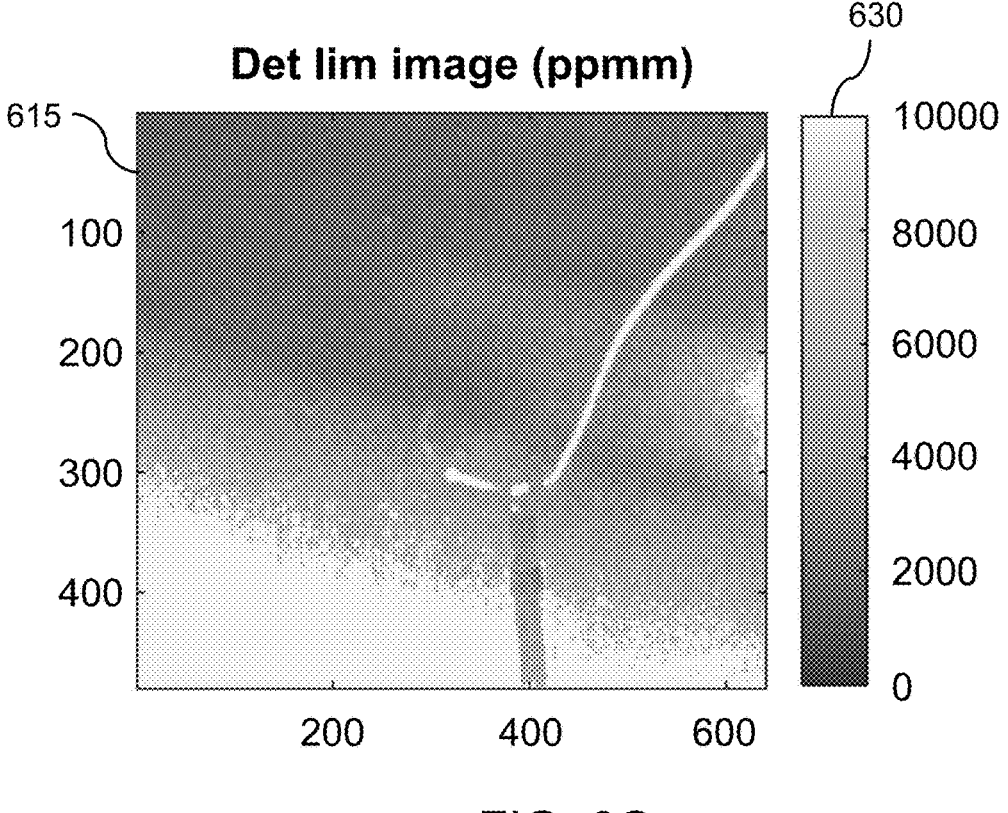
FIG. 6C illustrates an example detection threshold image associated with the thermal image of FIG. 6A in accordance with one or more embodiments of the present disclosure.
Figure 7A:
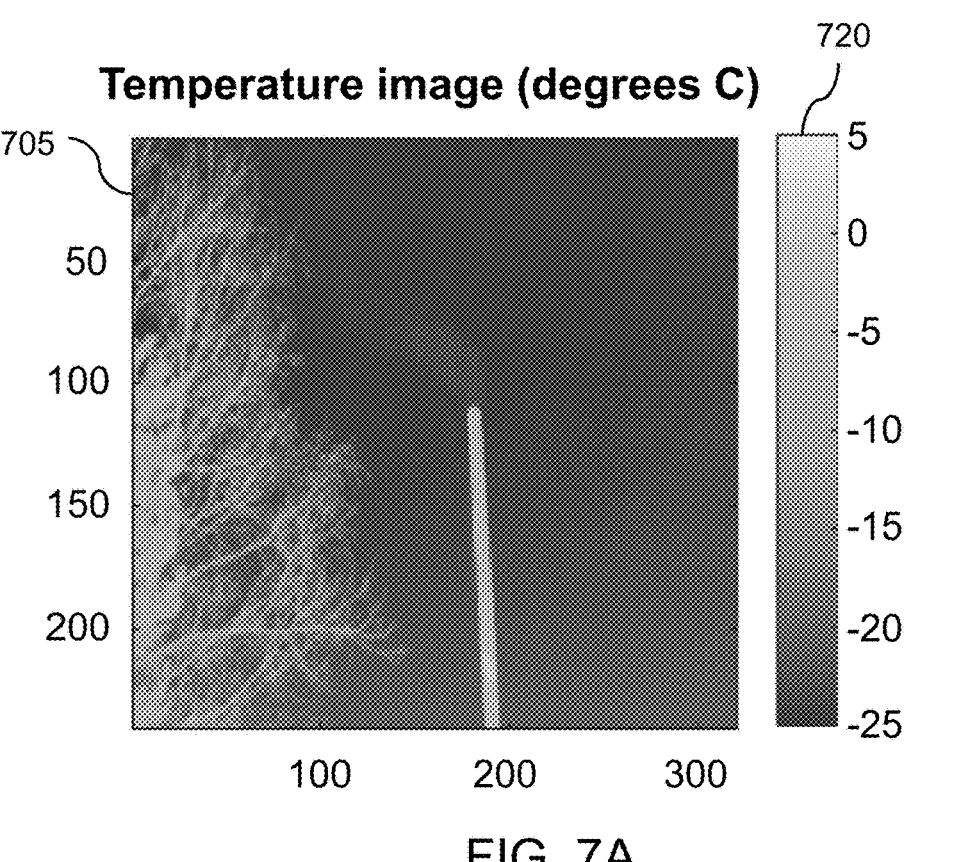
FIG. 7A illustrates an example thermal image in accordance with one or more embodiments of the present disclosure.
Figure 7B:
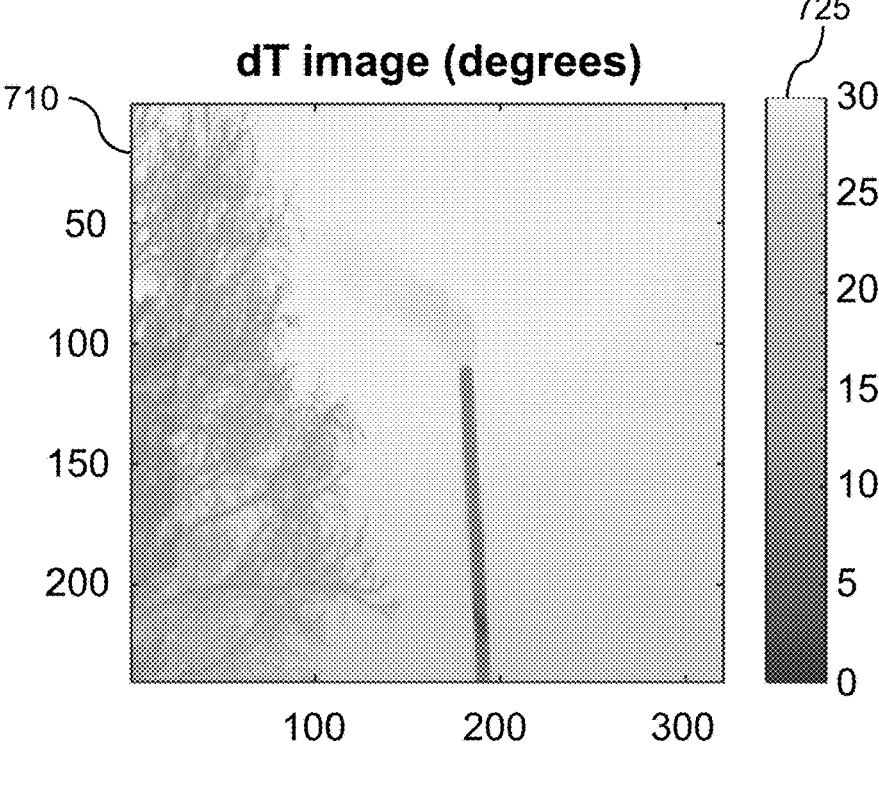
FIG. 7B illustrates an example temperature difference image associated with the thermal image of FIG. 7A in accordance with one or more embodiments of the present disclosure.
Figure 7C:
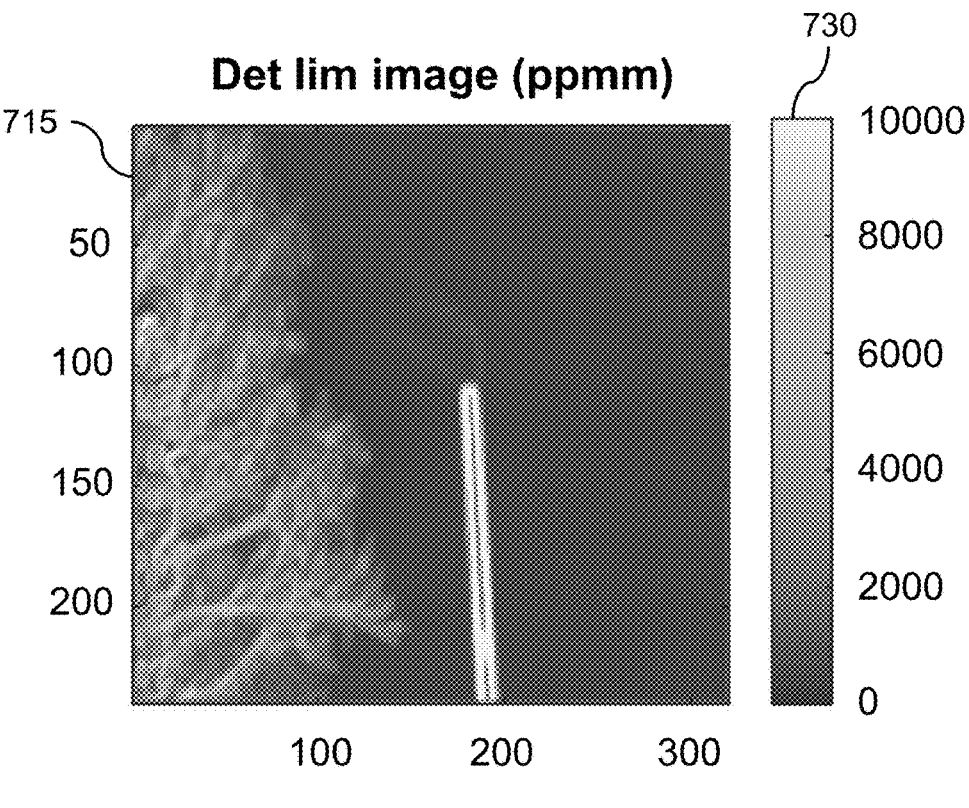
FIG. 7C illustrates an example detection threshold image associated with the thermal image of FIG. 7A in accordance with one or more embodiments of the present disclosure.
Figure 8A:
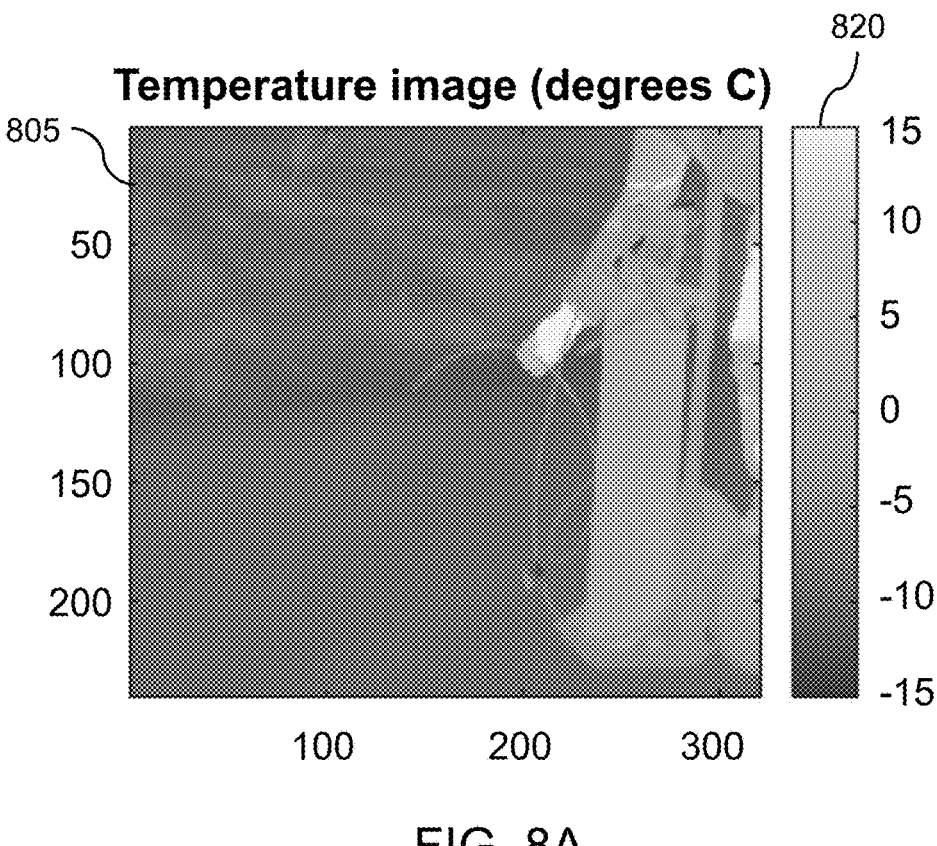
FIG. 8A illustrates an example thermal image in accordance with one or more embodiments of the present disclosure.
Figure 8B:
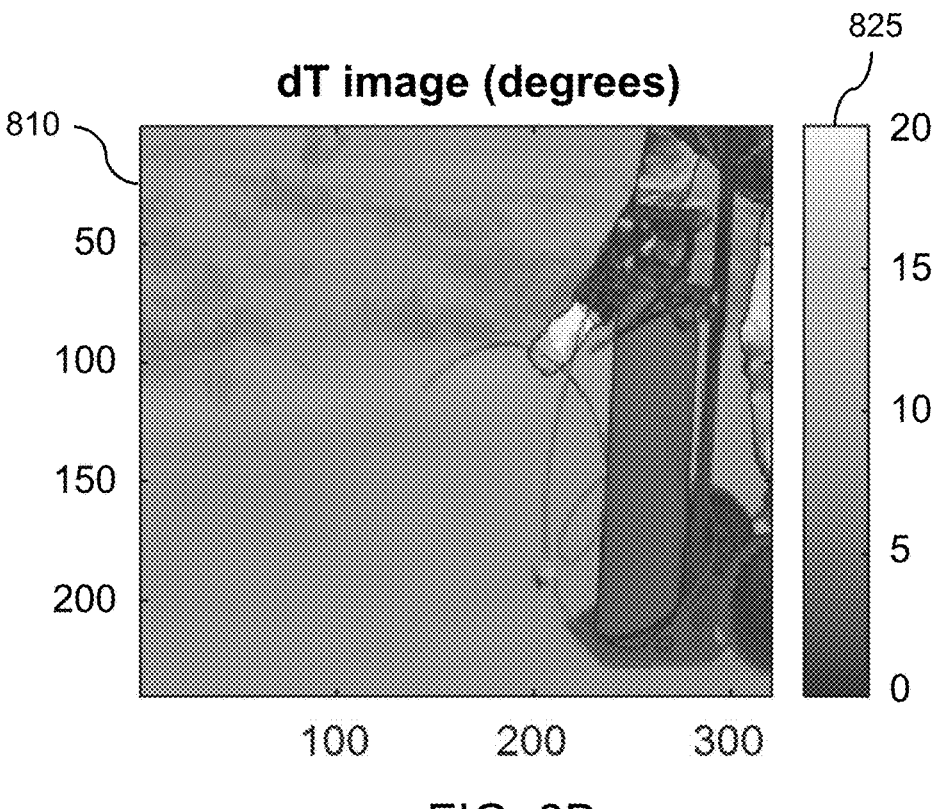
FIG. 8B illustrates an example temperature difference image associated with the thermal image of FIG. 8A in accordance with one or more embodiments of the present disclosure.
Figure 8C:
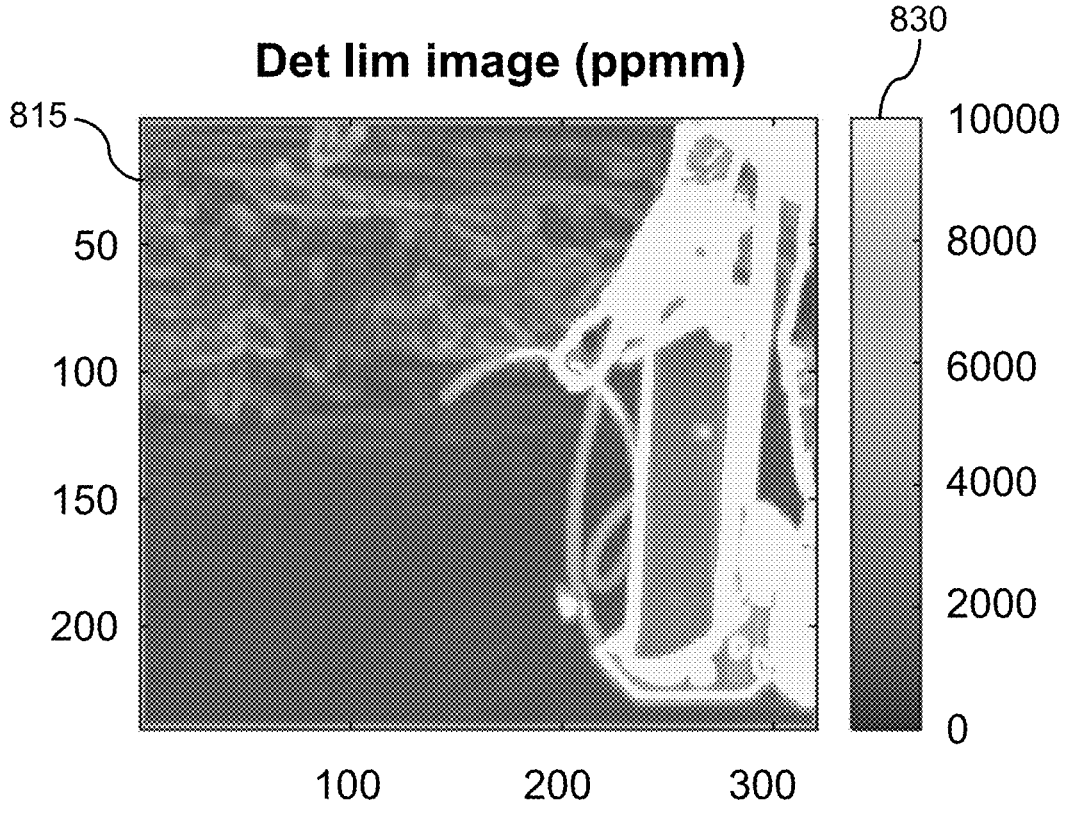
FIG. 8C illustrates an example detection threshold image associated with the thermal image of FIG. 8A in accordance with one or more embodiments of the present disclosure.

As non-limiting examples, FIGS. 6A through 8C illustrate various thermal images, temperature difference images, and detection threshold images. FIGS. 6A, 6B, and 6C illustrate a thermal image 605 and a temperature difference image 610 and a detection threshold image 615 corresponding to the thermal image 605 in accordance with one or more embodiments of the present disclosure. FIGS. 7A, 7B, and 7C illustrate a thermal image 705 and a temperature difference image 710 and a detection threshold image 715 corresponding to the thermal image 705 in accordance with one or more embodiments of the present disclosure. FIGS. 8A, 8B, and 8C illustrate a thermal image 805 and a temperature difference image 810 and a detection threshold image 815 corresponding to the thermal image 805 in accordance with one or more embodiments of the present disclosure. In some embodiments, the users may readily change/shift between viewing a thermal image, a temperature difference image, a detection threshold image, or two or more of these images simultaneously. For example, the users may readily select different operation modes using the control component 130 (e.g., knobs, buttons, keyboard, etc.).

In the thermal images 605, 705, and 805, a horizontal axis and a vertical axis provide column numbers and row numbers, respectively, and a representation value (e.g., color value or greyscale value) for each pixel (e.g., identified by a column number and row number) corresponds to a temperature associated with the pixel. Scales 620, 720, and 820 provide a mapping between representation values (e.g., color values or grayscale values) and temperature values. In the temperature difference images 610, 710, and 810, a horizontal axis and a vertical axis provide column numbers and row numbers, respectively, and a representation value for each pixel corresponds to a background-to-gas temperature difference associated with the pixel. Scales 625, 725, and 825 provide a mapping between representation values and temperature difference values. In the detection threshold images 615, 715, and 815, a horizontal axis and a vertical axis provide column numbers and row numbers, respectively, and a representation value for each pixel corresponds to a detection threshold associated with the pixel. Scales 630, 730, and 830 provide a mapping between representation values and detection threshold values (e.g., lowest detectable concentration length values).

As shown for example in the detection threshold images 615, 715, and 815, a higher temperature difference and a lower spatial modulation of a background may allow for a lower detection limit. The detection threshold may also be based in part on a temperature span of an image. For example, in FIG. 7A, the thermal image 705 has a temperature span of around-25° C. to around 5° C. In this example, scene image data associated with temperatures below −25° C. are represented using the same representation value (e.g., color value or grayscale value) as scene image data associated with a temperature of −25° C., and, similarly, scene image data associated with temperatures above 5° C. are represented using the same representation value as scene image data associated with a temperature of 5° C. If the temperature span is changed (e.g., by changing the endpoint −25° C. and/or the endpoint 5° C.), detection threshold data may change and thus a resulting detection threshold image may differ from the detection threshold image 715.

Figure 9:
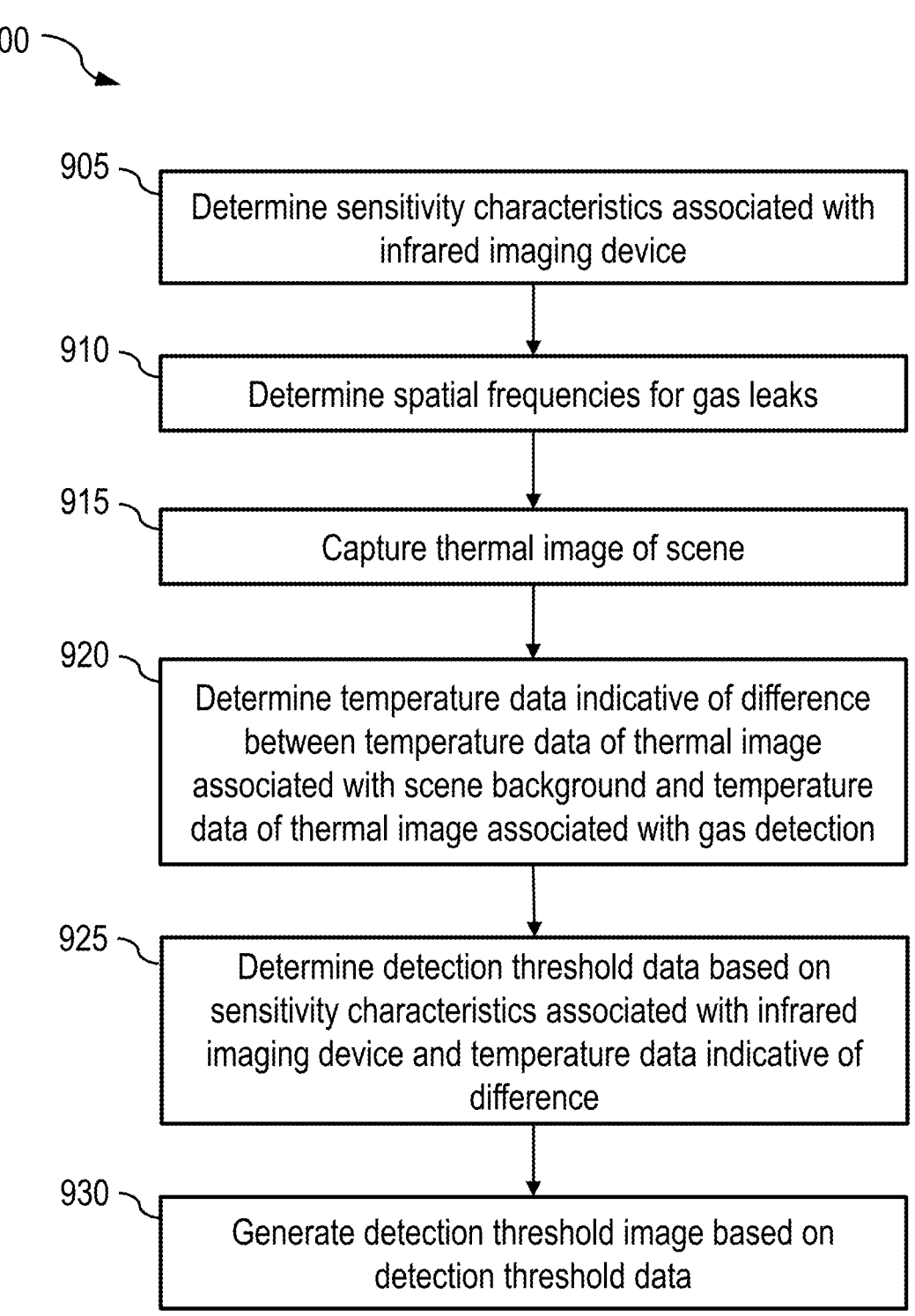
FIG. 9 illustrates a flow diagram of an example process for facilitating detection threshold determination in accordance with one or more embodiments of the present disclosure.

FIG. 9 illustrates a flow diagram of an example process 900 for facilitating detection threshold determination in accordance with one or more embodiments of the present disclosure. Although the process 900 is primarily described herein with reference to the system 400 of FIG. 4 for explanatory purposes, the process 900 can be performed in relation to other systems for determining detection thresholds (e.g., gas detection thresholds). Note that one or more operations in FIG. 9 may be combined, omitted, and/or performed in a different order as desired.

At block 905, the system characterization device 425 determines sensitivity characteristics associated with the system 400. In some aspects, the sensitivity characteristics may be determined (e.g., mapped out) by making measurements of the sensitivity characteristics for different spatial frequencies and/or different dependent temperature spans represented in images. In some aspects, the sensitivity characteristics includes MRTD characteristics associated with the system 400. In such aspects, a measurement procedure of MRTD may be performed according to standard test methods, such as a standard test method set forth by the ASTM. In some cases, a lower temperature span of an image is generally associated with a lower MRTD and thus lower detection limit.

At block 910, the system 400 (e.g., the system characterization device 425) determines typical spatial frequencies for gas leaks. For a given gas of interest, the spatial frequency(ies) of the gas may determine the MRTD value(s) (e.g., associated with a portion of the MRTD curve) of the system 400 that is of interest. The MRTD value(s) can be correlated by the noise in the scene 450 and a noise equivalent concentration length (NECL) value of the gas to obtain a value of the detectable concentration length of the gas. In some cases, the typical spatial frequencies may be determined based on images captured by the FPA 420 using different field of views, different viewing angles, and/or different distances between the FPA 420 and scene objects (e.g., including gases). In this regard, the spatial frequencies associated with a given gas depend on intrinsic properties of the gas (e.g., composition of the gas) as well as setup parameters (e.g., type of imaging equipment, position and orientation of imaging equipment relative to the gas, etc.) associated with imaging the gas. Properties of different gases may be stored in the memory 445.

At block 915, the FPA 420 captures a thermal infrared image of the scene 450. The FPA 420 may capture the image by capturing radiation (e.g., infrared radiation) from the scene 450 and generating the image in response to the radiation. In some cases, to reach the FPA 420, the radiation (e.g., from the scene 450) may propagate through an optical path of the infrared imaging system formed of one or more of the optical component(s) 410. In some cases, the FPA 420 and/or circuitry coupled to the FPA 420 may convert the radiation into electrical signals (e.g., voltages, currents, etc.) and generate image data based on the electrical signals. The image data may include pixel values. The pixel value of a pixel may be indicative of a temperature associated with the pixel. The pixel values may be represented in terms of digital count values generated based on the electrical signals obtained from converting the captured radiation. For example, in a case that the FPA 420 includes or is otherwise coupled to an ADC circuit, the ADC circuit may generate digital count values based on the electrical signals. For an ADC circuit that can represent an electrical signal using 14 bits, the digital count value may range from 0 to 16,383. In some cases, the FPA 420 may represent the image data in an image according to a palette. A given pixel of the image may have a visual representation value (e.g., a color value or a grayscale value) indicative of a temperature of the pixel.

In some cases, the FPA 420 may capture the image according to a set of setup parameters. The setup parameters may include a position of the FPA 420 (e.g., a position of the system 400 relative to the scene 450), a viewing angle of the FPA 420, a field of view of the FPA 420, a temperature span represented in the image, and a background (e.g., 310) of the scene 450. Detection thresholds associated with the FPA 420 may depend in part on the setup parameters. Certain parameters of the setup parameters and/or other parameters may be controllable by a user (e.g., an operator) of the system 400.

At block 920, the temperature difference device 430 determines temperature data indicative of a difference between temperature data of the thermal image associated with a background (e.g., 310) of the scene 450 and temperature data of the thermal image associated with gas detection in the scene 450. When the thermal image does not include a gas, or does not include a gas that affects the background temperature, the temperature difference data may be substantially zero. In some cases, the temperature data of the thermal image associated with the gas in the scene 450 may be, or may be based on, an ambient temperature. The ambient temperature may be obtained from a temperature measurement(s) from an external/ambient temperature sensor(s), available weather information (e.g., from online weather databases) when the thermal image is captured, using image algorithms, and/or other data. In some aspects, the temperature difference data may be determined on a pixel-by-pixel basis based on the thermal image. In some cases, the temperature difference data may be represented in a temperature difference image/map and processed, stored, and/or displayed to the user. Each pixel of the temperature difference image may correspond to one pixel of the thermal image. In this regard, the pixel of the temperature difference image may be based at least in part on the corresponding pixel of the thermal image.

At block 925, the detection threshold device 435 determines detection threshold data based on the sensitivity characteristics (e.g., MRTD characteristics) associated with the system 400 and the temperature difference data. In some aspects, the detection limit data may be, may include, or may be indicative of concentration lengths (e.g., in units of ppmm). The detection threshold data may be based on relationships between a detection threshold metric/characteristic (e.g., a lowest detectable concentration length), a sensitivity metric/characteristic (e.g., MRTD value), and a background-to-gas temperature difference. Such relationships may be determined during calibration and/or procedures to measure performance characteristics of the system 400 and represented as lookup tables, maps/images, equations, etc.

In some aspects, the detection threshold data may be determined based on other factors. In some cases, the factors may include setup parameters such as a position of the FPA 420 (e.g., the position of the system 400 relative to the scene 450), a viewing angle of the FPA 420, a field of view of the FPA 420, a temperature span represented in the image, and a background (e.g., 310) of the scene 450. As non-limiting examples, the detection threshold data may be determined based on a spatial noise/modulation of the background and/or a span (e.g., temperature span/range) associated with the thermal image. The spatial noise/modulation of the background may be determined/calculated locally in the thermal image (e.g., by the detection threshold device 435 and/or other components). In some cases, an MRTD value may be considered to scale with this background noise (e.g., similar to scaling of an MRTD with an intrinsic noise in an image). In an aspect, the MRTD value scaled with the background noise (e.g., and/or other factors) may be referred to as an effective MRTD value. An MRTD (and associated detection threshold) is generally lower when a displayed image is represented with a lower span (e.g., lower temperature span, lower temperature range). In some cases, MRTD measurements may be made with different spans of an image to determine a relationship between the span and the MRTD. For example, infrared data represented using an image having a span of –20° C. to 120° C. is generally associated with a higher MRTD than the same infrared data represented using an image having a lower span of 35° C. to 100° C.

At block 930, the detection threshold device 435 generates a detection threshold image based on the detection threshold data. A given pixel of the detection threshold image may have a visual representation value (e.g., a color value or a grayscale value) indicative of a detection threshold associated with the pixel. In some aspects, the detection threshold associated with a pixel may be, may include, or may be indicative of a concentration length (e.g., a lowest concentration length) associated with the pixel. The detection threshold data may be based on relationships between a detection threshold metric (e.g., a concentration length), a sensitivity characteristic (e.g., MRTD value), and a background-to-gas temperature difference. Such relationships may be determined during calibration and/or procedures to measure performance characteristics of the system 400 and represented as lookup tables, maps/images, equations, etc.

Thus, using various embodiments, the system 400 may generate and display images having detection threshold data. Such images may be used to facilitate decision support for users searching for gas leaks. The user may analyze (e.g., via visual inspection and/or machine inspection) the detection threshold images and use these images for decision support. Based at least in part on these detection threshold images, the user may choose/set controllable/selectable variables such as better backgrounds, better locations, better camera position, better viewing angles, and/or other parameters to be more amenable to detection of a particular gas(es) of interest. In this regard, for a given gas of interest, backgrounds, locations, viewing angles, and so forth associated with lower detection thresholds (e.g., lower concentration lengths that can be detected) are generally more desirable for detection of the gas of interest. In some embodiments, the users may readily change/shift between viewing a thermal image, a temperature difference image, a detection threshold image, two or more of these images simultaneously, and/or other data.

As a first example scenario, a user may inspect a valve for leaks of a certain size. The user may enable a detection threshold mode of the system 400 such that the system 400 may generate detection threshold images containing detection threshold data. The user may capture detection threshold images (e.g., the system 400 captures thermal images and generates the detection threshold images based in part on the thermal images) using different viewing angles and/or different backgrounds and determine a setup (e.g., combination of viewing angle and background) that provides a detection limit low enough for potential gas leaks of interest to be detectable.

As a second example scenario, the system 400 may be, or may include, a fixed mount camera that needs to be mounted and an optimal position for mounting may need to be determined. A user may mount the camera at different positions and capture detection threshold images with the camera positioned at these positions. The user may determine the position(s) that provides a detection limit low enough for potential gas leaks of interest to be detectable.

As a third example scenario, a user may need support to determine which days and weather conditions may be advantageous for a certain inspection. The user may capture detection threshold images on different days of a week and under different weather conditions to determine which days and weather conditions would be preferable for the inspection.

As a fourth example scenario, if a user increases a span (e.g., a temperature range) of a displayed image until gas plumes barely are detectable and then switch to the detection threshold mode, an estimate of the concentration lengths of the gas plumes may be obtained.

Where applicable, various embodiments provided by the present disclosure can be implemented using hardware, software, or combinations of hardware and software. Also where applicable, the various hardware components and/or software components set forth herein can be combined into composite components comprising software, hardware, and/ or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into substeps to provide features described herein.

The foregoing description is not intended to limit the present disclosure to the precise forms or particular fields of use disclosed. Embodiments described above illustrate but do not limit the invention. It is contemplated that various alternate embodiments and/or modifications to the present invention, whether explicitly described or implied herein, are possible in light of the disclosure. Accordingly, the scope of the invention is defined only by the following claims.

What is claimed is:

1. A method comprising:
   capturing, by an imaging device, a first thermal image of a scene;
   determining first temperature difference data indicative of a difference between temperature data of the first thermal image associated with a background of the scene and temperature data of the first thermal image associated with gas detection;
   determining first detection threshold data based on sensitivity characteristics associated with the imaging device and the first temperature difference data; and
   generating a first detection threshold image based on the first detection threshold data, wherein each pixel of the first detection threshold image corresponds to a respective pixel of the first thermal image and has a value indicative of a detection threshold associated with the respective pixel of the first thermal image.

2. The method of claim 1, further comprising displaying the first detection threshold image.

3. The method of claim 1, further comprising receiving user input, wherein the generating the first detection threshold image is in response to the user input.

4. The method of claim 1, further comprising:

receiving user input; and selectively displaying the first thermal image and/or the first detection threshold image in response to the user input.

5. The method of claim 1, wherein, for each pixel of the first detection threshold image, the detection threshold is indicative of a concentration length threshold associated with the pixel.

6. The method of claim 1, wherein the sensitivity characteristics comprise minimum resolvable temperature difference (MRTD) characteristics.

7. The method of claim 6, wherein the MRTD characteristics comprise MRTD values for different spatial frequencies and/or different temperature spans for representing thermal image data of the first thermal image.

8. The method of claim 1, further comprising determining spatial noise associated with the background, wherein the first detection threshold data is further based on the spatial noise.

9. The method of claim 1, wherein the first thermal image of the scene is captured according to a first set of setup parameters, the method further comprising:

capturing, by the imaging device, a second thermal image of the scene according to a second set of setup parameters;

determining second temperature difference data indicative of a difference between temperature data of the second thermal image associated with the background of the scene and temperature data of the second thermal image associated with the gas detection;

determining second detection threshold data based on the sensitivity characteristics associated with the imaging device and the second temperature difference data; and generating a second detection threshold image based on the second detection threshold data.

10. The method of claim 9, wherein the first set of setup parameters comprises a position of the imaging device, a viewing angle of the imaging device, a temperature span represented in the first thermal image, and/or the background of the scene.

11. The method of claim 9, wherein the first set of setup parameters comprises a first position of the imaging device when capturing the first thermal image, and wherein the second set of setup parameters comprises a second position of the imaging device when capturing the second thermal image.

12. The method of claim 1, further comprising generating a temperature difference image based on the first temperature difference data, wherein each pixel of the temperature difference image corresponds to a respective pixel of the first thermal image and has a value indicative of a temperature difference associated with the respective pixel of the first thermal image.

13. The method of claim 12, further comprising selectively displaying the first thermal image, the temperature difference image, and/or the first detection threshold image.

14. An infrared imaging system comprising:

an infrared imager configured to capture a first thermal image of a scene;

a logic device configured to:

determine first temperature difference data indicative of a difference between temperature data of the first thermal image associated with a background of the scene and temperature data of the first thermal image associated with gas detection;

determine first detection threshold data based on sensitivity characteristics associated with the infrared imager and the first temperature difference data; and generate a first detection threshold image based on the first detection threshold data, wherein each pixel of the first detection threshold image corresponds to a respective pixel of the first thermal image and has a value indicative of a detection threshold associated with the respective pixel of the first thermal image.

15. The infrared imaging system of claim 14, further comprising a display device configured to selectively display the first thermal image and/or the first detection threshold image in response to user input.

16. The infrared imaging system of claim 14, wherein, for each pixel of the first detection threshold image, the detection threshold is indicative of a concentration length threshold associated with the pixel.

17. The infrared imaging system of claim 14, wherein the sensitivity characteristics comprise minimum resolvable temperature difference (MRTD) characteristics.

18. The infrared imaging system of claim 14, wherein the logic device is further configured to determine spatial noise associated with the background, and wherein the first detection threshold data is further based on the spatial noise.

19. The infrared imaging system of claim 14, wherein:

the first thermal image of the scene is captured according to a first set of setup parameters;

the first set of setup parameters comprises a position of the infrared imager, a viewing angle of the infrared imager, a temperature span represented in the first thermal image, and/or the background of the scene;

the infrared imager is further configured to capturing a second thermal image of the scene according to a second set of setup parameters; and the logic device is further configured to:

determine second temperature difference data indicative of a difference between temperature data of the second thermal image associated with the background of the scene and temperature data of the second thermal image associated with the gas detection;

determine second detection threshold data based on the sensitivity characteristics associated with the infrared imager and the second temperature difference data; and generate a second detection threshold image based on the second detection threshold data.

20. The infrared imaging system of claim 14, wherein the infrared imager comprises a plurality of microbolometers.

* * * * *